(12) United States Patent
Signitzer et al.

(10) Patent No.: US 6,546,663 B1
(45) Date of Patent: Apr. 15, 2003

(54) FISHING LURE

(76) Inventors: Paul Signitzer, 18 Pleasant Street, Red Hill, Queensland 4059 (AU); Andrew Fogarty, 89 Ryan Street, Innisfail, Queensland 4059 (AU); Michael Fogarty, 34 Aaron Street, Bray Park, Queensland 4500 (AU)

( * ) Notice: Subject to any disclaimer, the term of this patent is extended or adjusted under 35 U.S.C. 154(b) by 0 days.

(21) Appl. No.: 09/632,641

(22) Filed: Aug. 4, 2000

(30) Foreign Application Priority Data

Aug. 6, 1999 (AU) ............................................. PQ2082
Mar. 17, 2000 (AU) ............................................. PQ6362

(51) Int. Cl.[7] ............................................................ A01K 85/00
(52) U.S. Cl. ........................ 43/4.5; 43/42.02; 43/42.24; 43/42.26; 43/42.28; 43/42.1; 43/42.31; 43/42.36
(58) Field of Search ............................. 43/42.02, 42.26, 43/42.28, 42.24, 42.27, 42.1, 4.5, 42.36, 42.31

(56) References Cited

U.S. PATENT DOCUMENTS

| | | | | |
|---|---|---|---|---|
| 1,510,923 A | * | 10/1924 | Cosey | 43/42.48 |
| 2,597,792 A | * | 5/1952 | Hardy | 43/42.15 |
| 2,663,964 A | | 12/1953 | Martin | |
| 2,770,063 A | | 11/1956 | Martin | |
| 2,910,799 A | * | 11/1959 | Wentworth | 43/42.02 |
| 2,932,112 A | * | 4/1960 | Graves, Jr. | 43/42.02 |
| 3,313,058 A | * | 4/1967 | Fuerst | 43/42.02 |
| 3,376,663 A | * | 4/1968 | Amrine | 43/42.02 |
| 3,543,430 A | * | 12/1970 | Brokaw | 43/42.02 |
| 5,170,579 A | * | 12/1992 | Hollinger | 43/42.06 |
| 5,406,738 A | * | 4/1995 | Holleman, Sr. | 43/42.15 |
| 5,787,634 A | * | 8/1998 | Way | 43/42.15 |
| 5,829,183 A | | 11/1998 | Guerin | |
| 5,911,571 A | * | 6/1999 | Wittbrot, III | 43/42.15 |
| 5,915,944 A | * | 6/1999 | Strunk | 43/42 |
| 6,141,900 A | * | 11/2000 | Rudolph | 43/42.24 |
| 6,233,864 B1 | * | 5/2001 | Mathews, Jr. et al. | 43/42.31 |

* cited by examiner

*Primary Examiner*—Charles T. Jordan
*Assistant Examiner*—John W. Zerr
(74) *Attorney, Agent, or Firm*—Knobbe, Martens, Olson & Bear, LLP

(57) ABSTRACT

The present invention relates generally to fishing lures, and more particularly to fishing lures of a type which simulate crustaceans. The present invention is also aimed at providing a fishing lure which simulates a natural range of motions of a crustacean as observed by the target prey, or which at least provides a useful alternative to known lures.

43 Claims, 17 Drawing Sheets

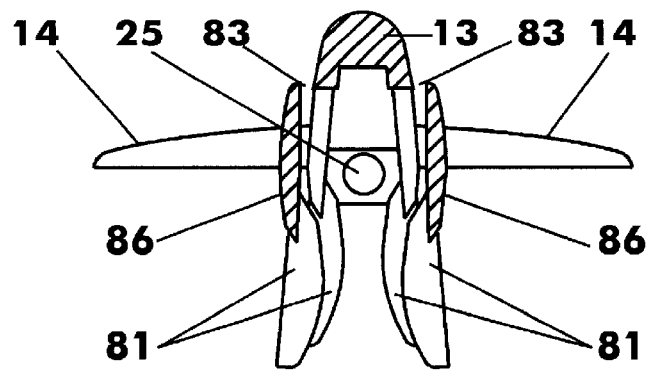
FIG. 9
FIG. 10A
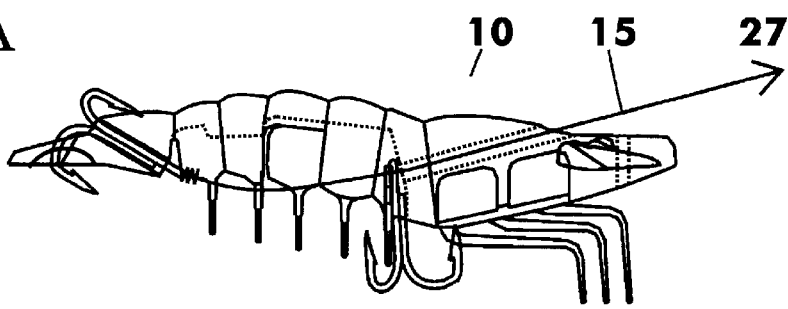
FIG. 10B
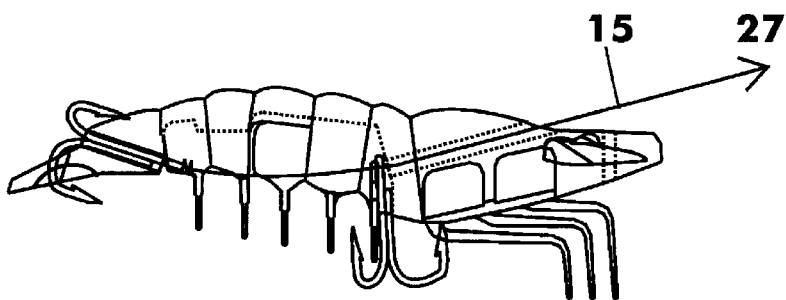
FIG. 10C
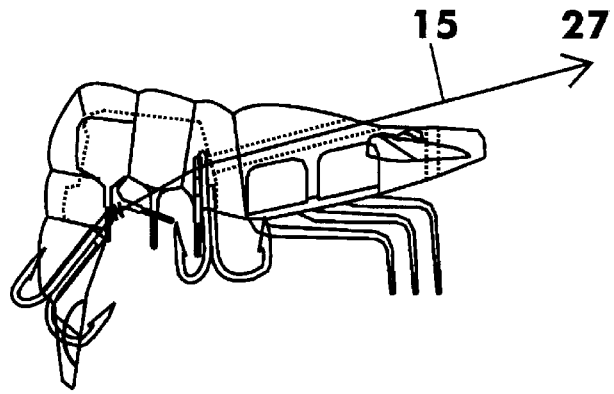

FISHING LURE

This application claims priority to Australian Provisional Patent Application No. PQ2082, filed Aug. 6, 1999, and Australian Provisional Patent Application No. PQ6362, filed March 17, 2000.

FIELD OF THE INVENTION

The present invention relates generally to fishing lures, and more particularly to fishing lures of a type which simulate crustaceans.

BACKGROUND OF THE INVENTION

Reference to any prior art in this specification is not, and should not be taken as, an acknowledgment or any form of suggestion that this prior art forms part of the common general knowledge in Australia or any other country.

Fishing lures are typically attached to a fishing line and one or more fish hooks are typically attached to the lure in such a way that a fish biting on the lure is caught on the fish hooks. Live crustaceans, such as prawns, shrimp and crayfish generally move forward through water by walking on the subterrain or by a slow swimming action using their pleopods or swimmerets. Under distress, or as an escape response, these creatures commonly react with a snapping or flicking action of the tail to propel themselves more quickly through the water. Repeated flicking actions generally results in rapid movement, sometimes in a somewhat erratic fashion, away from a perceived threat. The flicking action of the tail results from curling and uncurling of the tail and body of the crustacean, and the flicking action creates a pressure wave that may be recognized by predatory fish.

Lures have been developed which mimic, in a rudimentary fashion, the appearance or behavior of crustaceans. One device, pulled tail first through the water, uses the force of water on the tail to articulate the tail with respect to the body. However, the lure simulates the tail flicking motion only when the lure is pulled backwards through the water.

SUMMARY OF THE INVENTION

Throughout this specification, unless the context requires otherwise, the word "comprise", or variations such as "comprises" or "comprising", will be understood to imply the inclusion of a stated element or integer or group of elements or integers but not the exclusion of any other element or integer or group of elements or integers.

The present invention is aimed at providing a fishing lure which simulates a natural range of motions of a crustacean as observed by the target prey, or which at least provides a useful alternative to known lures.

Reference herein to "simulates" includes but is not limited to the fishing lure resembling or otherwise having similarity to a crustacean at the levels of sound, appearance, texture and/or feel. The effectiveness of the instant lure is predicated in part on the overall combination of visual appearance and action of mobility. Both appearance and motion take on a natural form.

With the foregoing in view, this invention in one aspect resides broadly in a fishing lure of the type that simulates a crustacean including:

- a forward portion adapted to simulate a forward portion of the crustacean;
- a rearward portion adapted to simulate a rearward portion of the crustacean, the rearward portion being flexibly connected to the forward portion such that the forward portion and rearward portion may be moved with respect to each other between a flexed position and a rest position;
- connection means on the rearward portion for connection of the fishing line to the rearward portion; and
- guide means through which the fishing line may slidably pass, the guide means being associated with the forward portion whereby, in use, a tugging action on the fishing line causes the rearward portion to move with respect to the forward portion from the rest position towards the flexed position to simulate a tail flicking motion of the crustacean.

In a preferred embodiment, the forward portion corresponds to the head and the rearward portion corresponds to the tail. In one embodiment, the guide means is operably associated with the forward portion and juxtaposed to the connection means.

Preferably, biasing means is provided for biasing the forward and rearward portions to the rest position. The biasing means may be operably associated with the forward and rearward portions near to or remote from the flexible connection, or may be inherent in the flexible connection. For example, the flexible connection may be a hinge-like connection with the biasing means being in the form of a returning hinge mechanism acting between the forward portion and the rearward portion. Alternatively, the flexible portion may be in the form of an elastomeric bridging portion between the forward portion and the rearward portion and may be formed from an inherently resilient material, the biasing means being constituted by the elastic memory inherent in the elastomeric material forming the bridging portion. In a further alternative, the forward portion and the rearward portion are formed integrally from an inherently resilient material, and one or more sections of smaller cross-section may be provided to constitute the flexible connection. Where a resilient material is used, the relative movement between the forward and the rearward portions maybe about a non-fixed axis. However, it is preferred that the arrangement of the guide means and the connection means results in a hinge-like pivoting between the forward and rearward portions upon tugging of the fishing line.

The rearward portion may include a plurality of interconnected segments, each of which is flexibly connected to another in a similar manner to the flexible connection between the forward portion and the rearward portion, and at least one of the segments is operatively associated with the guide means and the connection means as hereinbefore described.

In a particularly preferred embodiment, the lure is designed as a complete body solution with flexion resulting from two body elements with transmissional flexing systemically through the body segmentation.

Preferably, the guide means is in the form of a channel or passage in the forward portion. Preferably, the flexible connection is positioned remote from the path that the fishing line takes through the guide means, or the connection means is arranged so that the fishing line follows a non-linear path through the guide means in such manner that the application of a tugging force to the fishing line transmits a tugging type force to the rearward portion causing a flexing of the flexible connection. For example, the fishing line may have a clear span between the connection means and the guide means, whereby a shortening of the span caused by tugging on the fishing line in turn causes movement of the forward and rear portions with respect to one another at least part way to the flexed position.

The connection means may be provided by any suitable arrangement. For example, the connections may include an eyelet attached to or integrally molded with the rearward portion. Alternatively, the connection means may be constituted by the eye of a fishing hook fixedly or removably mounted relative to the rearward portion. In a preferred embodiment, the rearward portion includes a guide through which the fishing hook shaft extends such that the eye of the fishing hook projects through the underside of the rearward portion.

In another aspect of the invention, there is provided a fishing lure for mimmicking characteristics of a crustacean in water, including:

a head portion;

a tail portion having at least one fan portion at an end thereof; and a flexible bridge portion connecting the head and tail portions whereby the head portion and tail portion are resiliently and rotationally movable relative to each other through flexion of the bridge portion;

whereby, in use in water, when the tail portion is caused to move rotationally toward the head portion, the at least one fan portion creates a pressure wave in the water, detectable by a fish and simulative of the pressure wave created by a tail flicking action of an actual crustacean.

preferably, the lure comprises a head portion and a flexible body portion permitting transmissional controlled flexing systematically through the body element.

The motion provides leverage on the water causing a movement response at an angle to the force applied by the tail fan.

The preload of the tail gives more advantageous angle for the tail to apply force onto the water—hence a more natural flicking motion.

As the line force is applied, the tail fans flex off providing directional stability). Once at full flexion, the tail fan returns through the neutral position creating a return flick in the tail fan. This function amplifies the pressure wave generated by the tail fan to that simulating real prawns. The inherent elasticity (rapid recovery) of the material helps to achieve this snapping function.

In a further aspect of the invention, there is provided a fishing lure for mimicking characteristics of a crustacean in water, including:

a head portion having at least one first projection associated therewith;

a tail portion having at least one fan portion at an end thereof and at least one second projection associated therewith; and a flexible bridge portion connecting the head and tail portions whereby the head portion and tail portion are resiliently and rotationally movable relative to each other through flexion of the bridge portion;

whereby, when the tail is caused to move rotationally toward the head portion to at least a predetermined degree, respective ones of the at least one first projection and the at least one second projection are caused to frictionally engage each other to create a sound detectable by a fish and simulative of the sound created by a tail flicking action of an actual crustacean.

In the preferred embodiment, the frictional engagement of projections activated through flexion, occurs in a hollowed out underbody region. The engaging projections are attached to thin walled body segments in the hollowed out flexion zone. As a consequence of the free attachment of the side walls in the flexion region, they vibrate under frictional engagement of projections attached—promoting pressure wave generation. These thin walled zones act as amplification mechanisms increasing the noise and pressure anomalies created by the flicking noise.

Fish detect prey using visual, chemosensory and lateral line sensory tools in water. The lateral line is a sensory organ receptive to pressure wave variations in the water.

The pleapods and walking legs are soft flexible projections at the underside of the lure body. They closely represent indicative legs and pleapods as seen in real crustaceans. As the lure is moved through the water, turbulence is created, emitting small pressure waves. Fish interpret the pressure wave/turbulence information emitted from the lure as well as the visual image as the projections of live wild crustaceans in the water.

The lure preferably comprises projections simulating pleapods and walking legs. These create turbulence emitting small pressure waves and turbulence which in combination provide the impression of many projections emulating the natural movement of a crustacean, such as a prawn. The lure preferably comprises hollow cavities which act as an amplification mechanism to increase noise and pressure emissions created by the flicking motion. As the hinge sides are preferably free, they vibrate under frictional engagement providing a pressure wave amplification. Reference herein to "frictional engagement" includes any form of engagement of surfaces such as but not limited to a "slapping" motion.

In yet another aspect of the invention, there is provided a fishing lure for mimicking characteristics of a crustacean in water, including:

a head portion;

a tail portion having at least one fan portion at an end thereof; and a flexible bridge portion connecting the head and tail portions whereby the head portion and tail portion are resiliently and rotationally movable relative to each other through flexion of the bridge portion, the bridge portion having a continuous elastomeric portion for biasing the tail portion against rotational movement towards the head portion.

Preferably, the head portion, tail portion and bridge portion are formed integrally as parts of a body portion. Preferably, the front projections create resistance on the water, increasing the mechanical advantage of tail flexion. Preferably, the body portion is injection molded from a plastics material having an elastic memory. Preferably, the plastics material is polyurethane from about 30 to about 140 duro hardness such as from about 60 to about 100 including about 80 duro hardness. The term "about" in this context include a variation of about 10 units. Any other material including rubber which can be manipulated to produce that texture, appearance, feel and motion of a crustacean is encompassed by the present invention. Preferably, the lure simulates a member of the family penaeidae, aristeidae, solenoceridae, astacidae, austroastacidae, parastacidae or other kind of crustacean commonly used as bait for fishing. More preferably, the lure simulates a prawn, shrimp or crayfish.

Preferably, the head portion of the lure includes at least one forward projection extending therefrom and having sufficient surface area so as to meet with inertial resistance of the water against forward movement of the lure when the lure is pulled forward. Preferably, there are two forward projections, for stabilizing the orientation of the lure so as to resemble the normal upright orientation of the crustacean, each forward projection being angled somewhat outwardly and downwardly. Advantageously, the two forward projections may be enlarged to meet with greater inertial resistance when the lure is given a sharp pull, thereby leaving the lure within closer proximity of an interested fish while facilitating a stronger tail flicking action of the lure. Preferably, resistance applied on the head increases mechanical advantage of tail flexion. Further advantageously, the two forward projections may be formed to simulate outstretched claws, eyes, antennules or antennal scales. Alternatively, the lure may have only one forward projection in the form of a bib.

Preferably, the lure includes at least one hook for hooking a fish. Preferably, the lure includes a first hook and a second hook, the first hook being operably associated with the rearward (tail) portion and the second hook being located adjacent the forward (head) portion. Preferably, the second hook is, in use of the lure, removably locatable in a hook locating portion of the lure adjacent the forward (head) portion. Preferably, the hook locating portion is located immediately rearward of the forward portion, i.e. at the forward portion of the tail section. Preferably, in use of the lure, the at least one hook is connected to a fishing line to thereby connect the lure to the fishing line. Preferably, in use of the lure, the first hook is tied to the fishing line and the second hook is threaded thereon so as to be able to slide freely along the fishing line. In one embodiment, the at least one hook is a single hook. In other embodiments, the hooks are multiple hooks such as double or treble hooks. Generally the hooks are removable and different hooks may be inserted depending on the location, type of fish sought at legal requirements in the country, state, region or territory. The present invention extends, however, to lures manufactured with permanently mounted hooks.

The locating mechanisms permit the optimal positioning such that when a fish strikes the lure and engages the hook point, the hook breaks free from restraint, presenting the entire hook gape and increasing hook penetration. The hooks' location is integral to the lure design, with the hooks either releasing from the lure body or integral body flexion (i.e. as the fish strikes, the lure body flexes, exposing the hook point and gape) to permit increased penetration angle to improve hook up.

The hooks are positioned to reduce snagging. The hooks are positioned in such a way to minimize the capacity to engage the points on foreign objects as they pass closely by (based on forward swimming motion).

Advantageously, the lure will be seen by the fish to be facing away attempting to move away in a natural manner. Advantageously, the tail flicking motion may be induced with relatively little movement of the lure through the water.

The distinction between different body parts of some crustaceans may not be readily identifiable and therefore the points or regions of flexible connection between body parts may vary between embodiments of the invention. For example, the head portion and the lower body portion (corresponding to the abdomen, for example) may be flexibly connected, or two or more parts of the tail may be flexibly connected. Also, the term "tail flicking motion" refers to movement of the rearward portion of the lure with respect to the forward portion in a similar manner to the tail flicking motion made by an actual crustacean as an escape response to a predator. This is a rapid flicking motion in the water which serves to propel the crustacean through the water including in an upward, upward backward and/or forward upward direction (taking the head as facing in the forward direction). Advantageously, embodiments of the invention provide for flexion of the tail portion with respect to the head portion over at least a portion of the abdomen, for example over two to three abdominal segments, thus providing a better simulation of the full abdominal flexion of most crustaceans during the tail flicking motion.

Advantageously, a pulling force may be applied to the fishing line which is sufficient to cause the tail flicking motion of the lure to simulate at least to a small extent the actual tail flicking action of a crustacean.

Advantageously, the lure will be seen by the fish to be facing away attempting to move away in a natural manner.

As referred to above, the lure permits a range of motions based on retrieval angle and strength of flick. With respect to crustaceans such as prawns and shrimps, when the line pull force is activated on the lure at an angle of approximately 45° to the neutral swimming force, the lure moves up in the water within the range of 45° relative to the line pull angle. Depending on the intensity of the pull force, the lure will move in the range of 5 to 30 cm from the neutral position prior to pulling, to the point of return to neutral position post pull. when the line pull force is activated on the lure at an angle of approximately 90° to the neutral swimming position, the lure moves up in the water within the range of 20° relative to the vertical line pull.

With a surface pull where no weights are incorporated, and the line pull force is applied at an acute angle, i.e. less than 30° to the horizontal, the lure will partially or fully break through the surface and depending on pull force intensity under normal fishing conditions, lift from the water, travel in an arching trajectory and land up to approximately 100 cm from exit point.

With respect to crustaceans, when the line pull force is activated on the lure at an angle of approximately 45° to the neutral swimming position, the lure moves back and up within a range of 90° relative to the line pull angle. Depending on the intensity of the pull force, the lure will move in the range of 5 to 30 cm from the neutral position prior to pulling, to the point of return to neutral position post pull.

When line pull force is activated on the lure at an angle of approximately 90° to the neutral swimming position, the lure moves back and up within the range of 60° relative to the vertical pull action.

When one or more strong quick pull forces are applied to the lure, the crustacean lure performs an erratic tumbleturn action (turn over on itself). The pull force activates the tail flick motion and rotates the lure through 180°, to be facing upside down and tail first towards the angler. The lure weighting causes the lure to spin about the axis of the line. Additional pull forces activate the lure from this reverse neutral position accentuating rearward flick backwards towards the angler.

The crustacean is balanced to descend through the water column after casting in an upright orientation (lifelike) and rest on the bottom, i.e. legs splayed and balancing claws up and forward and tail extended. The lure will maintain upright orientation with slow steady retrieve.

Weights are a useful and in some cases an integral aspect of the lure design. The weights are interchangeable to provide favorable fishing features. The weights provide the lure with mass to sink. The interchangeable weights permit different rates of sink, providing for presentation of the lure at different depths.

The weights also provide postural sink balance.

The present invention further provides a package comprising multiple components wherein a first component comprises a fishing lure of the type that simulates a crustacean including:

a forward portion adapted to simulate a forward portion of the crustacean;

a rearward portion adapted to simulate a rearward portion of the crustacean, the rearward portion being flexibly connected to the forward portion such that the forward portion and rearward portion may be moved with respect to each other between a flexed position and a rest position;

guide means through which the fishing line may slidably pass, the guide means being associated with the forward portion whereby, in use, a tugging action on the fishing line causes the rearward portion to move with respect to the forward portion from the rest position towards the flexed position to simulate a tail flicking motion of the crustacean;

a second component comprising one or more hooks;

an optional third component comprising weight means; and an optional fourth component comprising fishing line.

The package may also contain instructions for use. The instructions may be in written, video and/or electronic form. The lure may also be other forms as herein described.

Yet another aspect of the present invention contemplates a method for catching an aquatic animal, said method comprising attracting said aquatic animal to a fishing lure of the type that simulates a crustacean including:

a forward portion adapted to simulate a forward portion of the crustacean;

a rearward portion adapted to simulate a rearward portion of the crustacean, the rearward portion being flexibly connected to the forward portion such that the forward portion and rearward portion may be moved with respect to each other between a flexed position and a rest position;

connection means on the rearward portion for connection of the fishing line to the rearward portion; and guide means through which the fishing line may slidably pass, the guide means being associated with the forward portion whereby, in use, a tugging action on the fishing line causes the rearward portion to move with respect to the forward portion from the rest position towards the flexed position to simulate at least to a small extent a tail flicking motion of the crustacean and wherein hook means on the lure is capable of hooking said aquatic animal.

BRIEF DESCRIPTION OF THE DRAWINGS

Features of preferred embodiments of the invention are described hereinafter, by way of example only, with reference to the accompanying drawings in which:

FIG. 9 shows a sectional view on line A—A of FIG. 8a;

FIGS. 10a to 10f show, in side view, the sequential positions of a lure of a preferred embodiment of the invention in water in response to a jerk on the fishing line;

DETAILED DESCRIPTION OF THE PREFERRED EMBODIMENTS

Figure 1:
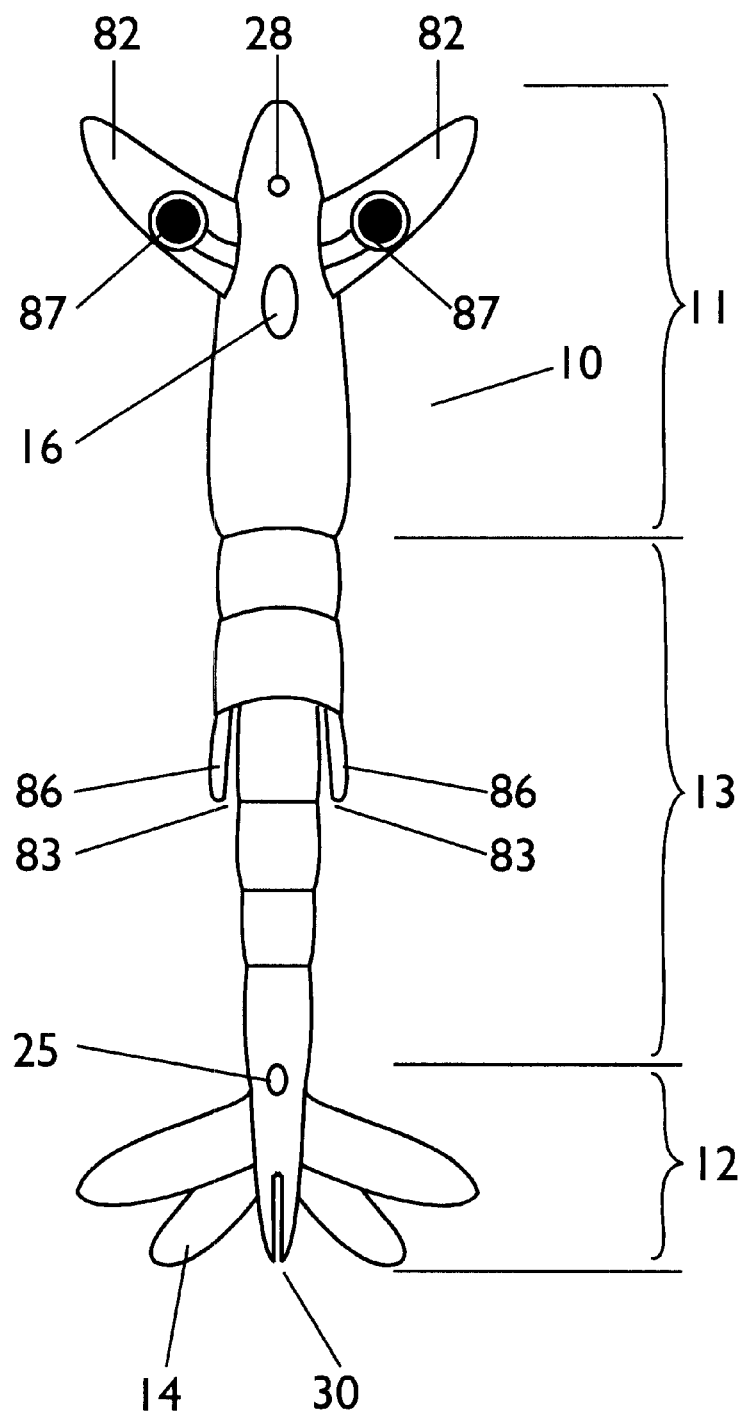
FIG. 1 is a plan view of a fishing lure according to a first preferred embodiment of the invention.

Hereinafter, unless otherwise indicated, like numerals designate like elements or features of the described embodiments.

Referring generally to FIGS. 1 to 9 and 11, a fishing lure 10 is made in the form of a prawn or shrimp. The fishing lure 10 includes a forward portion (which simulates the head or main body portion of the prawn or shrimp) 11 and a rearward portion 12 (which simulates the tail portion of the prawn or shrimp and includes a tail fan 14). The forward and rearward portions are connected by a flexure region 13. A lower passage 17 and an upper passage 16 extend through the forward portion 11. The lower passage 17 opens at one end centrally of the forward end and the upper passage 16 opens about midway along the top of the forward portion 11. Both passages open at their other ends near the flexure region 13. In use, a fishing line 15 passes through either the upper passage 16 or the lower passage 17 to the flexure region 13. The underside of the region 13 is hollowed out to permit the pivoting of the rearward portion 12 with respect to the forward portion 11. A main hook 18 in the form of a treble hook is inserted through a tail passage 25 passing through the rearward portion 12 so that the main hook can be connected to the fishing line 15. Optional hooks 19 may be connected to the line 15 under the flexure region 13 or to the main hook 18 if desired. A sinker line through-hole 28 is located in the forward portion 11 to accommodate an alternative weighting arrangement (described below and shown in FIG. 11).

As illustrated in FIG. 1, the lure 10 is proportioned so that the dimensions of the length of the forward portion 11, flexion region 13, rearward portion 12, the depth of the forward portion 11 and the width of the forward portion 11 are approximately of the ratio of 2.5:3:1:1:.

"The lure 10 also has appendages 81 which may simulate pleopods, uropods and/or swimmerets. The lure 10 also has stabilizing projections 82 for stabilizing the lure during movement through the water. Simulated eyes 87 are located on the projections 82 and are colored with an indelible ink or dye to enhance the simulation effect."

Flexure slits 83 are formed in the flexure region 13 to more readily permit the movement of the rearward portion 12 rotationally towards the forward portion 11. The flexure slits 83 effectively define side flaps 86 between which portions of the flexure region may pass, thereby allowing the rotational slotting of a rearward part of the flexure region between the flaps 86. This effect is particularly illustrated in FIG. 7. Advantageously, the flexure slits, in combination with the substantially hollowed underside of the flexure region 13, allow for a greater degree of rotation of the rearward portion 12 relative to the forward portion 11 than would be provided by a solid and continuous flexure region while substantially maintaining the appearance of a crustacean abdomen. The flexure slits 83 are complemented by tail slits 85 in the rearward portion 12 for enhancing the overall rotational flexion of the rearward portion 12 relative to the forward portion 11 when the line 15 is jerked forward. The closure of tail slits 85 (and corresponding initial flexion of the rearward potion 12 with respect to the forward portion 11) is illustrated in the transition of the lure from the position shown in FIG. 8a to that shown in FIG. 8b when the line 15 is jerked.

Figure 2:
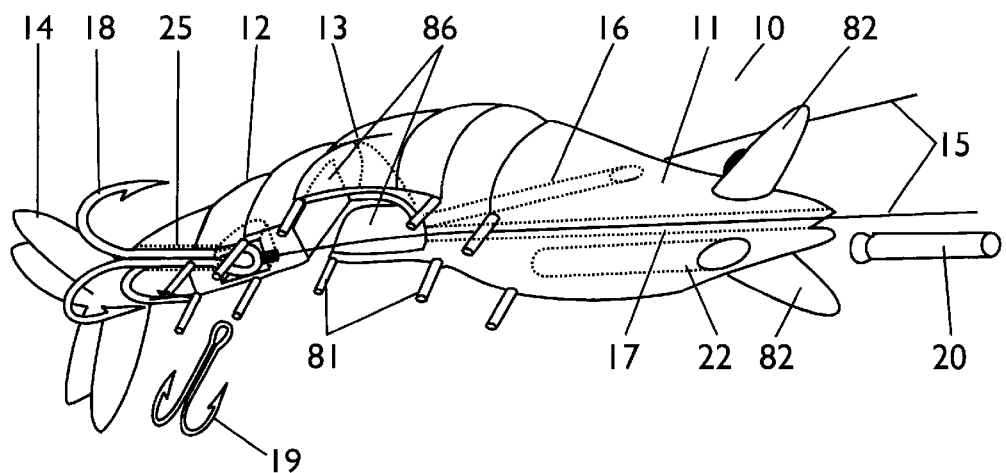
FIG. 2 is a perspective view of a fishing lure according to an embodiment of the invention in a rest position.
Figure 3:
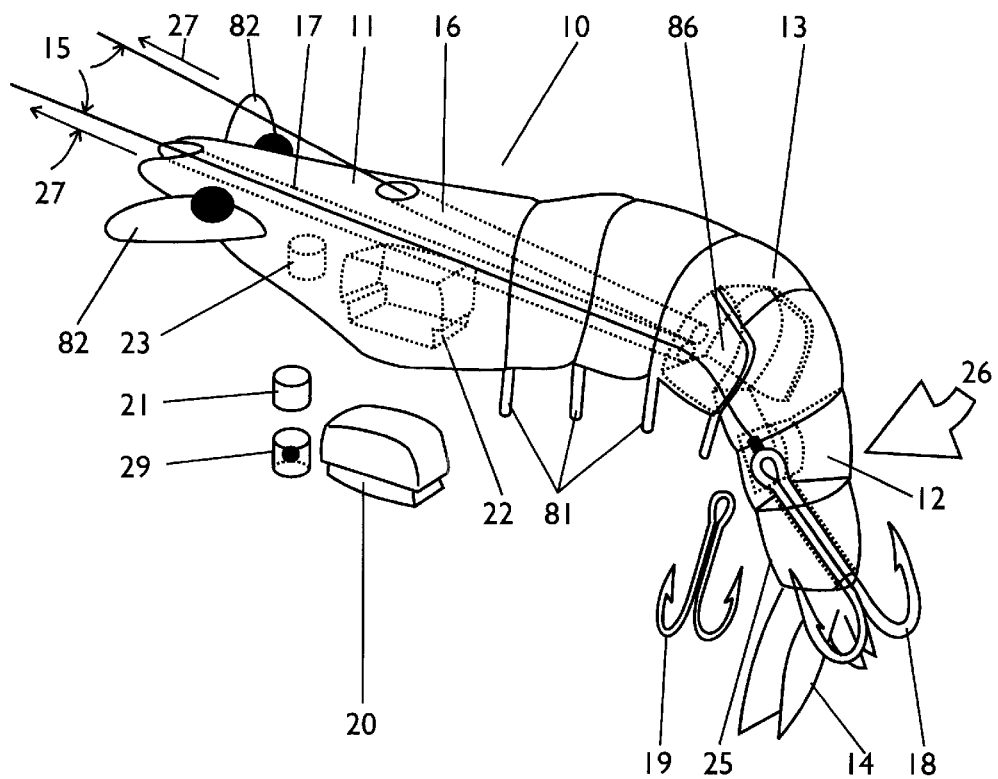
FIG. 3 is a perspective view of a fishing lure according to a further embodiment of the invention in a flexed position.
Figure 4:
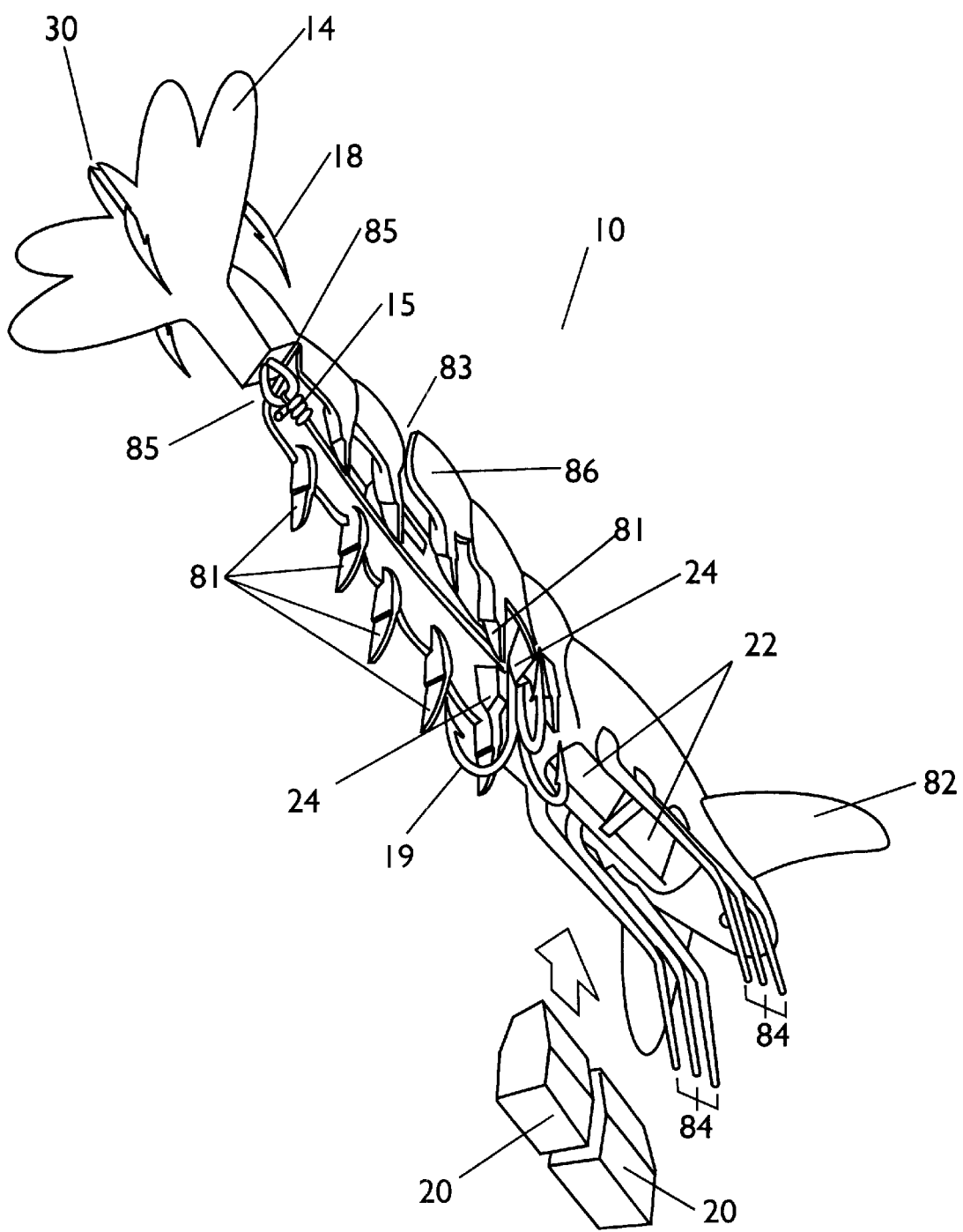
FIG. 4 is a perspective view of the underside of a fishing lure in accordance with the first preferred embodiment of the invention, with hooks in place in the lure.
Figure 5:
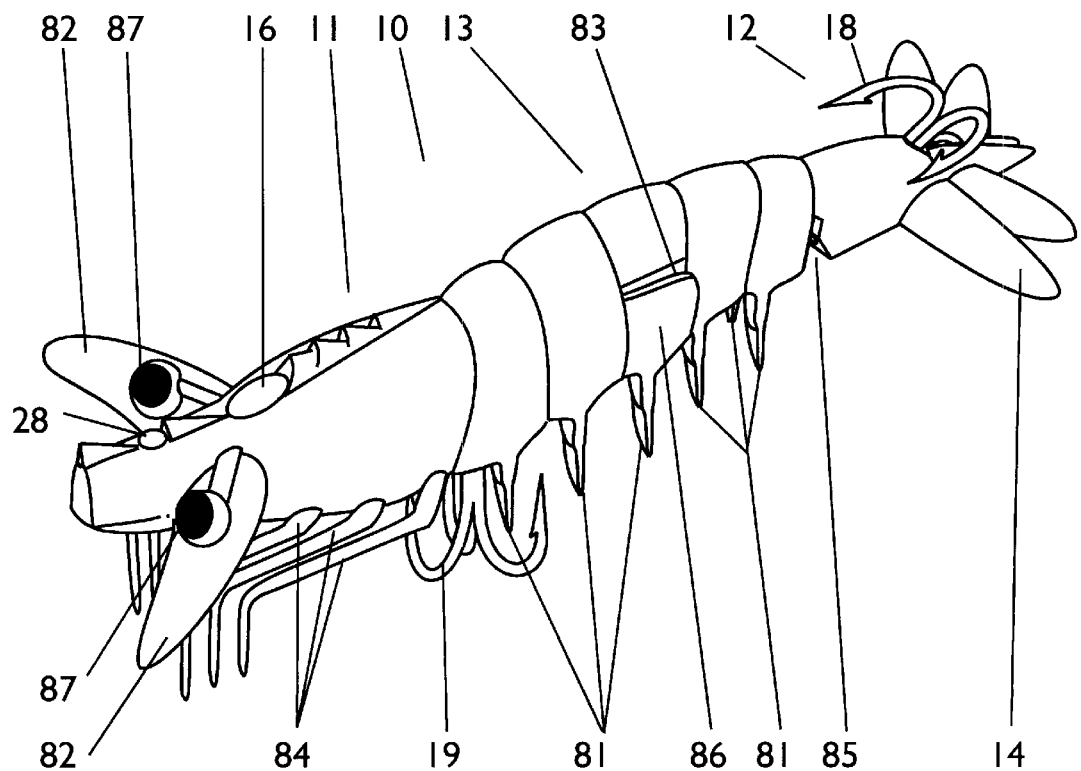
FIG. 5 is a perspective view from the front of a fishing lure in accordance with the first preferred embodiment of the invention.
Figure 6:
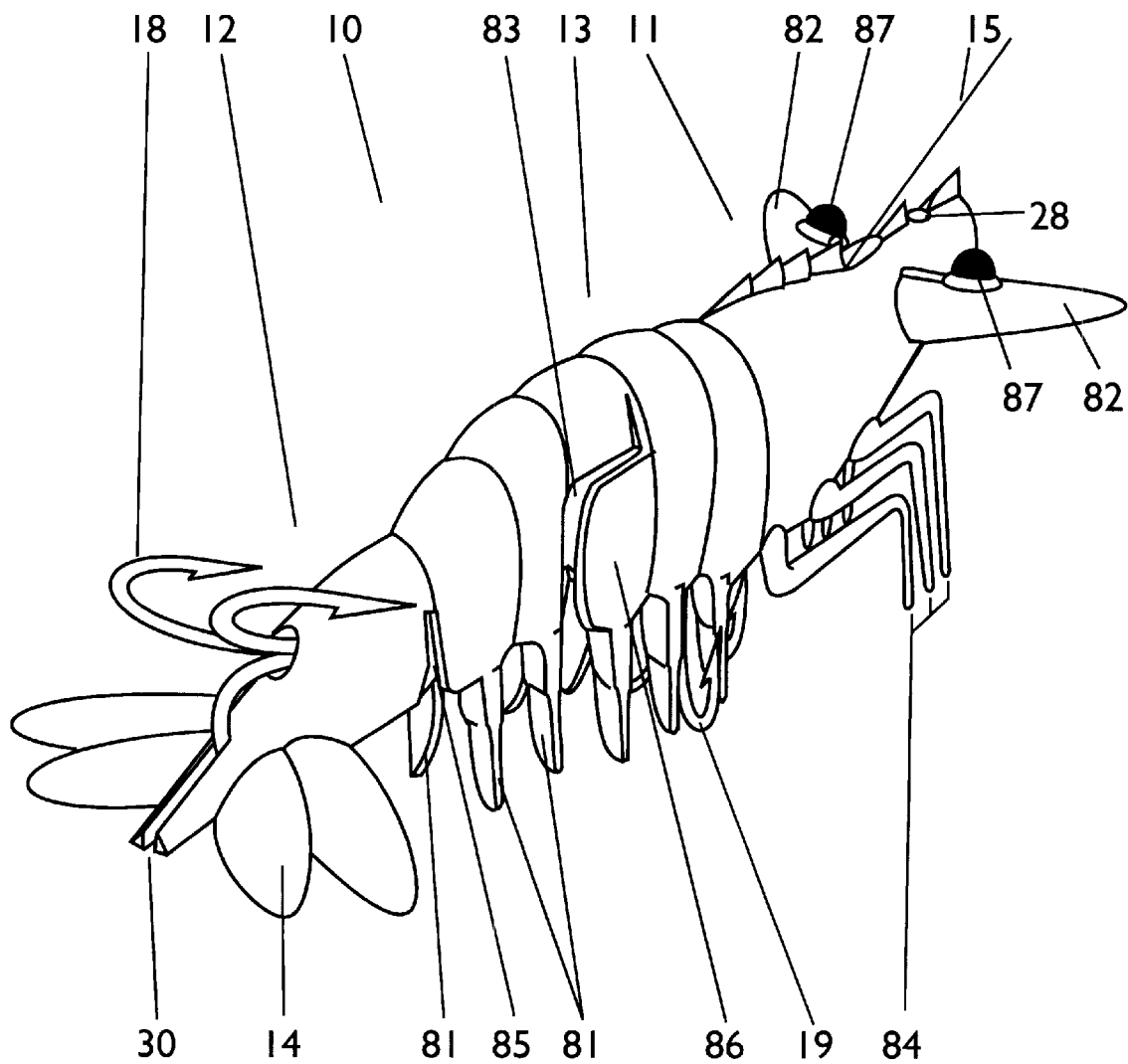
FIG. 6 is a perspective view from the rear of a fishing lure in accordance with the first preferred embodiment of the invention in a rest position.
Figure 7:
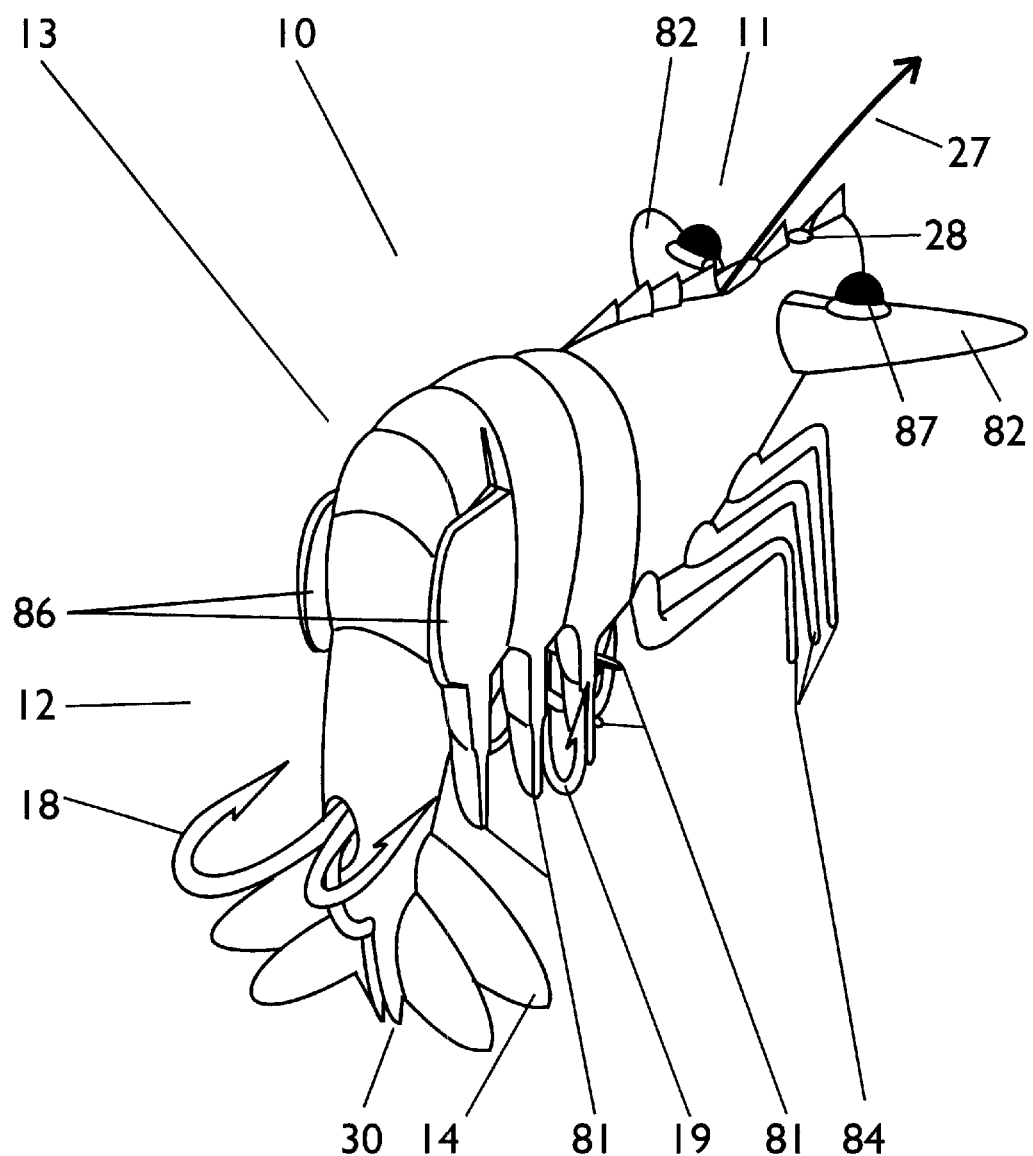
FIG. 7 is a perspective view from the rear of a fishing lure in accordance with the first preferred embodiment of the invention in a flexed position.

"As shown in FIGS. 2 to 4, one or more weights 20 are inserted in respective weight cavities 22 in the forward portion 11 to weigh down the front of the lure 10. While only one weight 20 and weight cavity 22 are shown in FIGS. 2 and 3, multiple weights 20 may be fitted into multiple weight cavities 22, as shown in FIG. 4, in order to achieve the appropriate weighting for a particular fishing application. Further, a scent pellet 21 may be inserted in pellet cavity 23 for providing a water soluble scent simulative of the crustacean. Alternatively, a rattle pellet 29 (having an internal granule for making a rattling sound in response to movement of the lure) may be inserted in the pellet cavity 23 for making a noise to attract a fish. Preferably the lure also includes cephalothoracic legs 84 to better simulate a crustacean."

The main hook 18, weight 20 and pellet 21, 29 are fitted to the lure 10 by means of an interference fit, or alternatively may be fixed in place in the lure by means of a suitable adhesive which is water-resistant, generally colorless when used on the lure 10 and has an odor which is not offensive to fish. The weight 20 may be removed manually if desired by deforming the lure body so as to neutralize the effect of the interference fit and pushing the weight 20 from the eight cavity 22.

Jerking, tugging or flicking the fishing line 15 causes a temporary tension force on the fishing line in the direction of the arrows 27 shown in FIG. 3. This temporary tension will cause a pivoting of the rearward portion 12 from the flexure region 13 with respect to the forward portion 11 in the direction of the arrow 26 shown in FIGS. 2 and 7. Tension on the fishing line, when effected, is transmitted to the main hook 18 which is located fixedly in the tail passage 25. The main hook 18 has a bend which locates it in place in a tail groove 30 in the tail fan 14 to prevent the main hook 18 from being pulled through the tail passage 25 when the fishing line is tugged or tensioned.

Figure 8A:
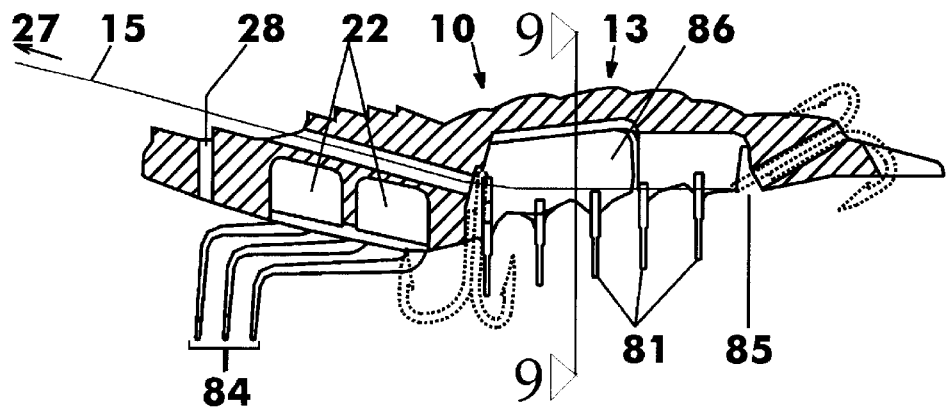
FIGS. 8a, 8b and 8c show cross-sectional views of the fishing lure of FIG. 6 in successive flexing positions ranging from the rest position to the flexed position.
Figure 8B:
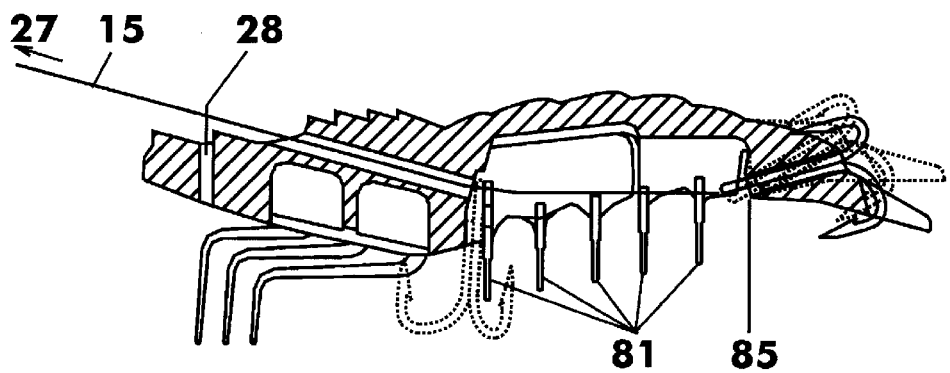
Figure 8C:
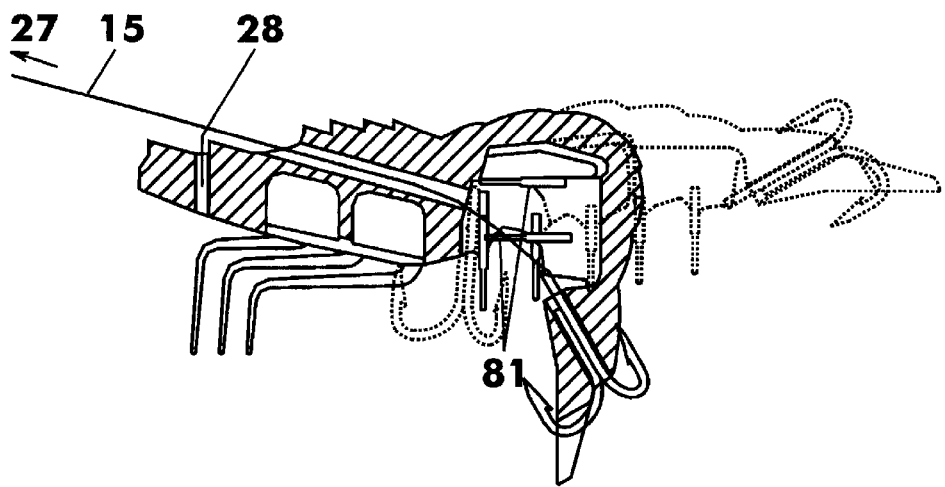
Figure 10D:
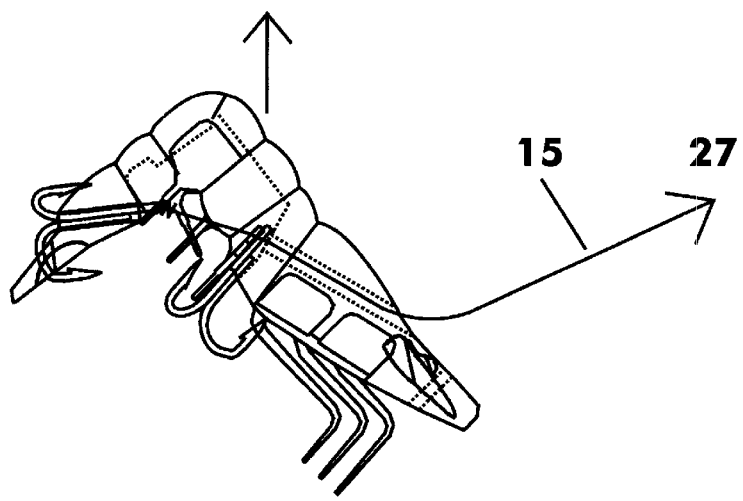
Figure 10E:
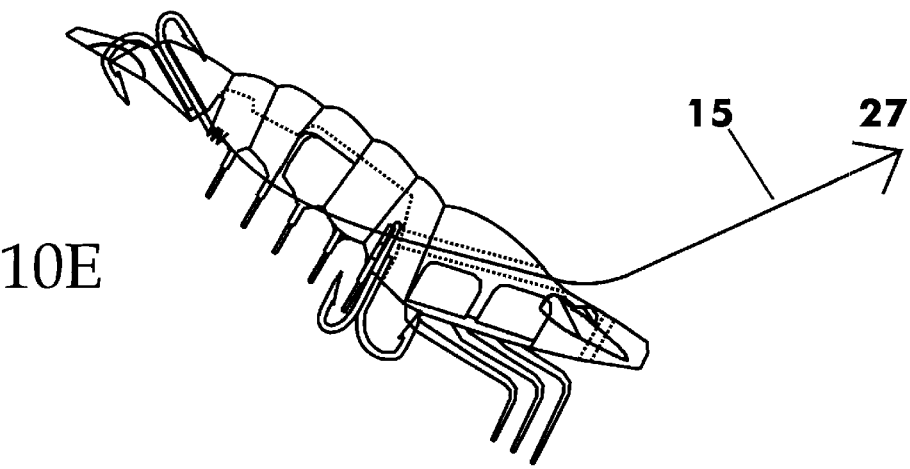
Figure 10F:
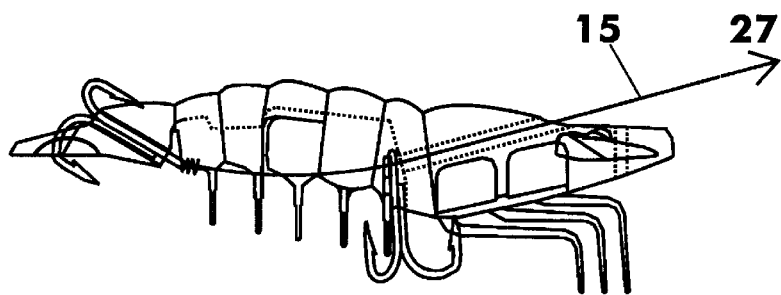

FIGS. 8a to 8c illustrate the flexion of the flexion region 13 during rotational movement of the rearward portion 12 relative to the forward portion 11. The relatively thin dimension of the upper part of the flexure region 13 advantageously provides for ease of rotational flexion. FIGS. 10a to 10f, shown as steps 1 to 6 respectively, illustrate the sequential positions of the lure 10 in water in response to a jerk on the fishing line. Steps 1 to 3 correspond substantially to the behavior of the lure illustrated in FIGS. 8a to 8c. Step 4 shows an upward movement of the lure 10 as a result of the inertial resistance of the water to forward rotation of the rearward portion 12. Coupled with the forward jerk on the line 15 in the direction indicated by arrow 27, the upward movement may give a resultant movement which is somewhat forward and upward. The forward projections 82 assist in reducing forward movement of the lure 10 when jerked (this is described in greater detail below). At step 5, the lure 10 returns to its rest position once the tension on the line 15 is released and the lure tends to drift downwardly in the water. At step 6, the lure 10 is once again in the rest position.

Figure 11:
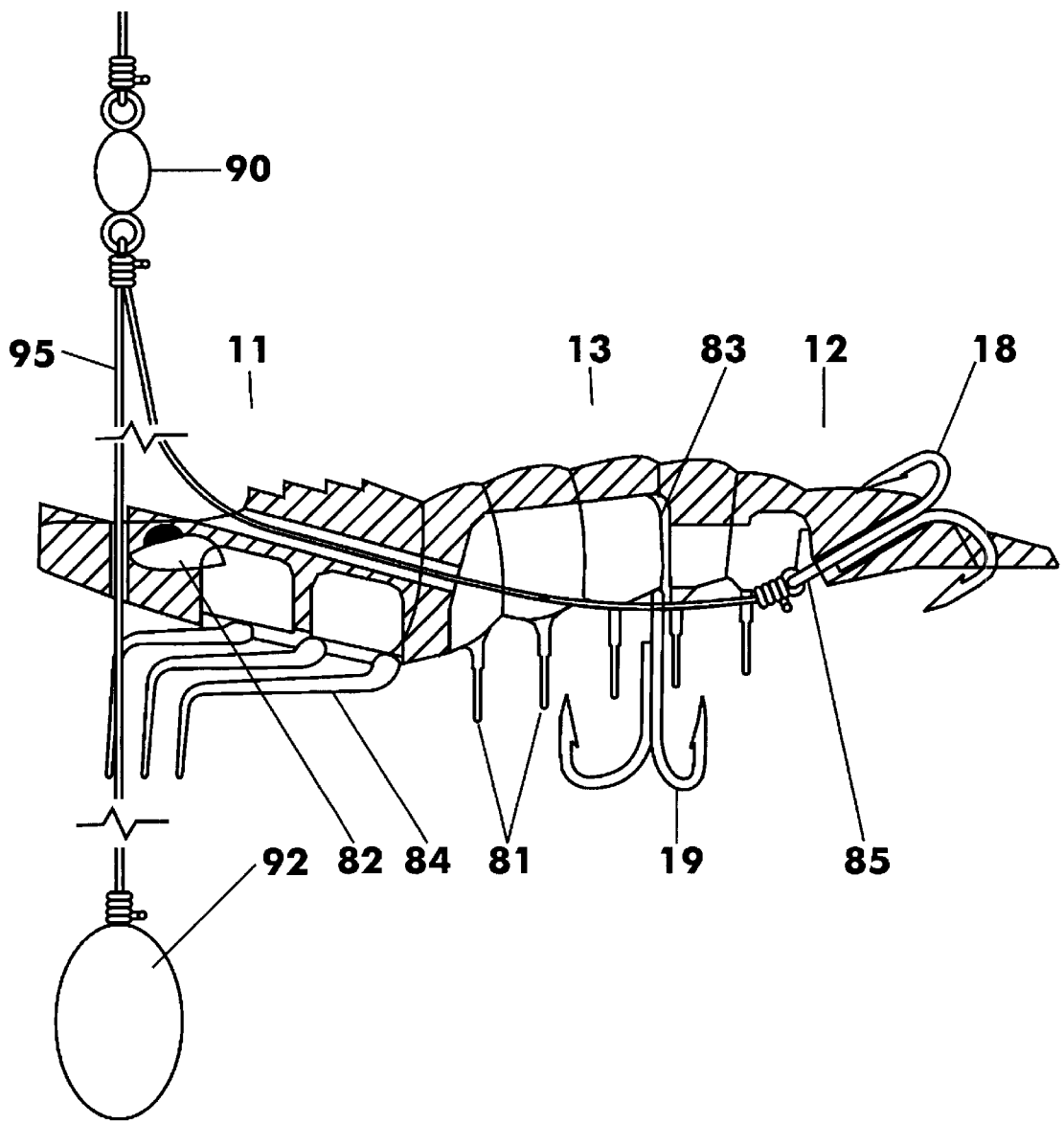
FIG. 11 shows the lure of the first preferred embodiment of the invention in cross-section, employed in an alternative line attachment arrangement.
Figure 12:
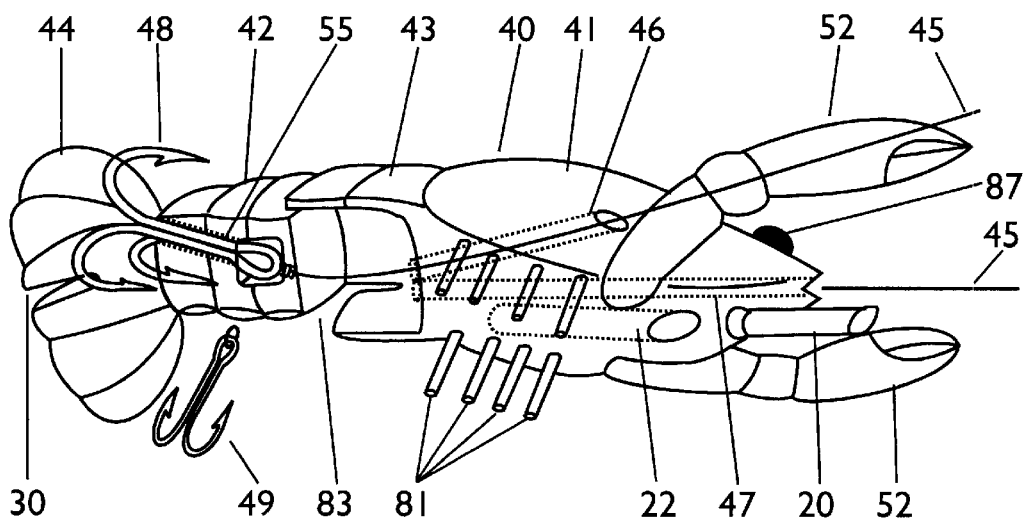
FIG. 12 is a perspective view of a fishing lure according to a further embodiment of the invention in a rest position.
Figure 13:
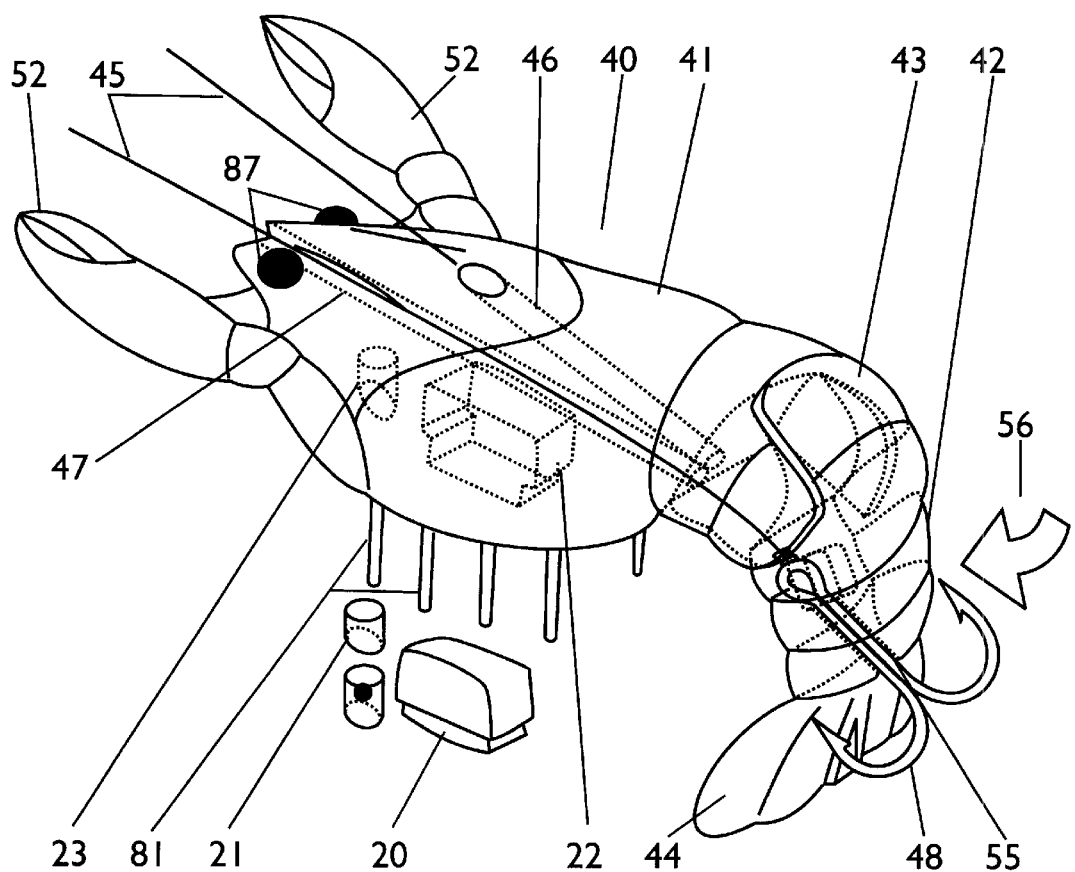
FIG. 13 is a perspective view of a fishing lure according to a further embodiment of the invention in a flexed position.
Figure 14:
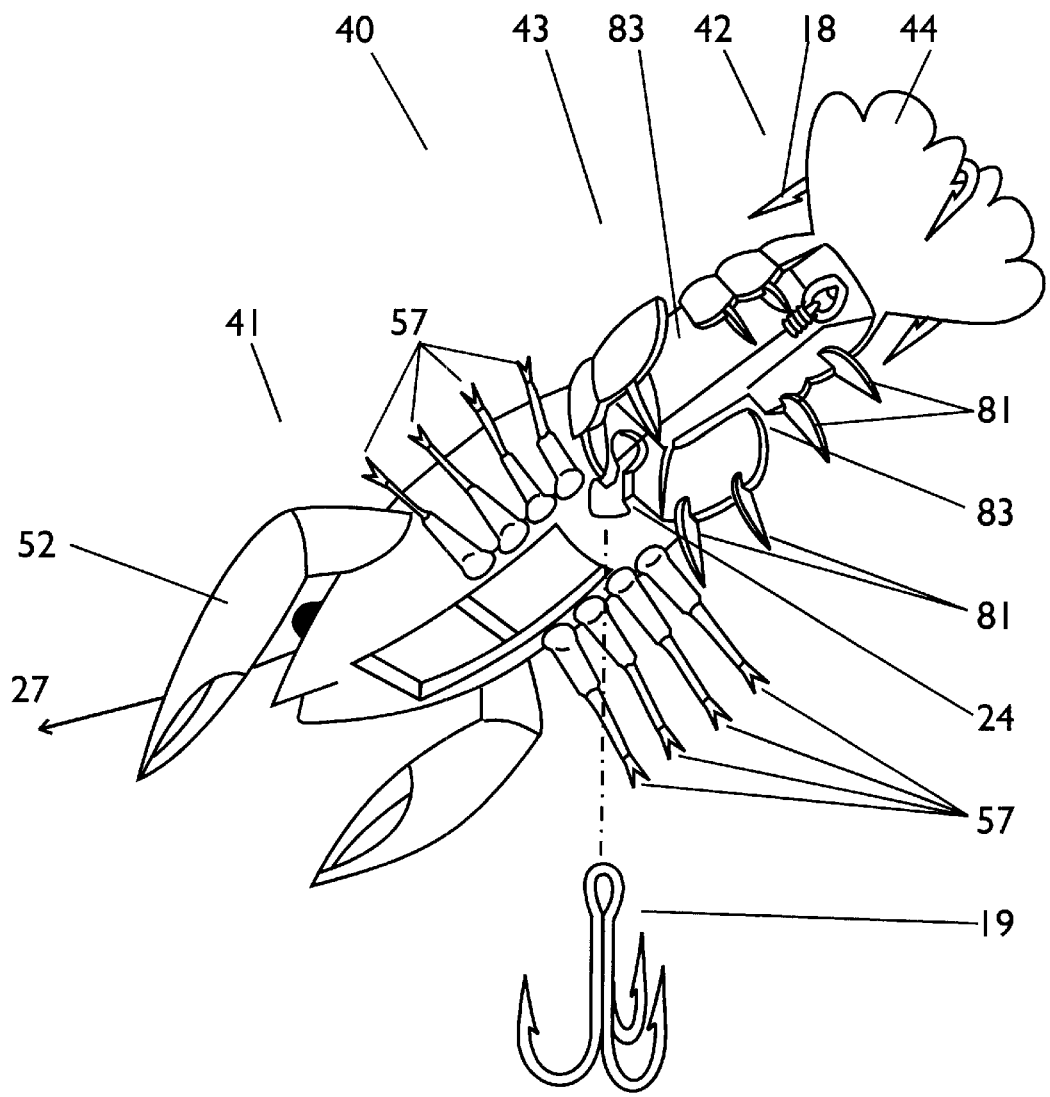
FIG. 14 is a perspective view of the underside of a fishing lure in accordance with a second preferred embodiment of the invention.

Shown in FIG. 11 is an alternative line attachment arrangement for attaching an added weight 92 to the lure 10. A swivel arrangement 90 may be used to connect the line 15 to an added weight line 95. The added weight line 95 passes through the sinker line through-hole 28 in the forward portion 11 of the lure 10. This arrangement may be used in deep fishing conditions in which it is desirable to weight the lure to such an extent that the lure falls more rapidly to a greater depth.

"Referring to FIGS. 12 to 17, an alternative fishing lure 40 is provided with a similar arrangement to the fishing lure 10 shown in FIGS. 1 to 11. The fishing lure 40 simulates a lobster or crayfish, and includes a forward portion 41, rearward portion 42, flexure region 43 and tail fan 44. The forward portion 41 includes an upper passage 46 and a lower passage 47 similar to the upper and lower passages described in relation to FIGS. 2 and 3. A fishing line 45 passes through either the upper passage 46 or the lower passage 47 and is connected to a main hook 48 which may have an optional hook 49 attached thereto. The fishing lure 40 also includes two simulated claws 52 formed with the forward portion 41 simulating the claws of a lobster or crayfish and simulated cephalothoracic legs 57. The main hook 48 passes through a tail passage 55. Tugging on the fishing line 45 causes the rearward portion 42 to flex downwardly in the direction of the arrow 56."

Figure 15:
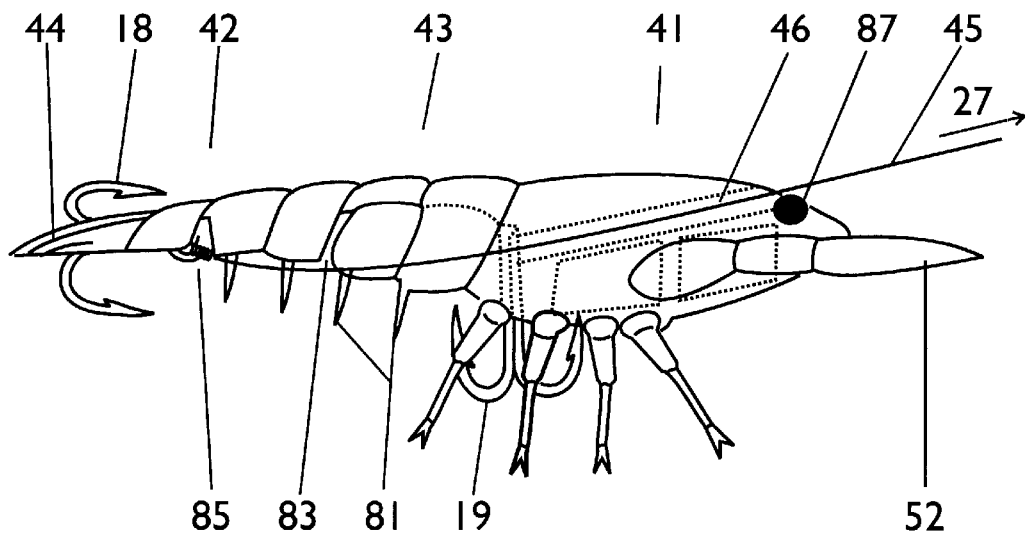
FIG. 15 is a side view of a fishing lure similar to the fishing lure shown in FIG. 14.
Figure 16:
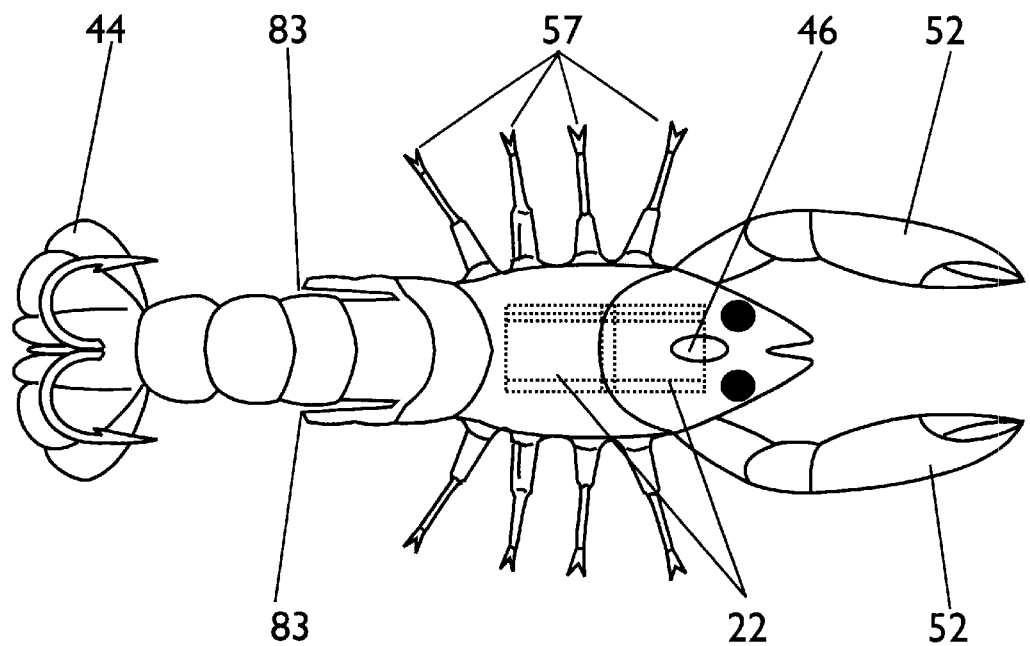
FIG. 16 is a top view of the fishing lure of FIG. 15.
Figure 17:
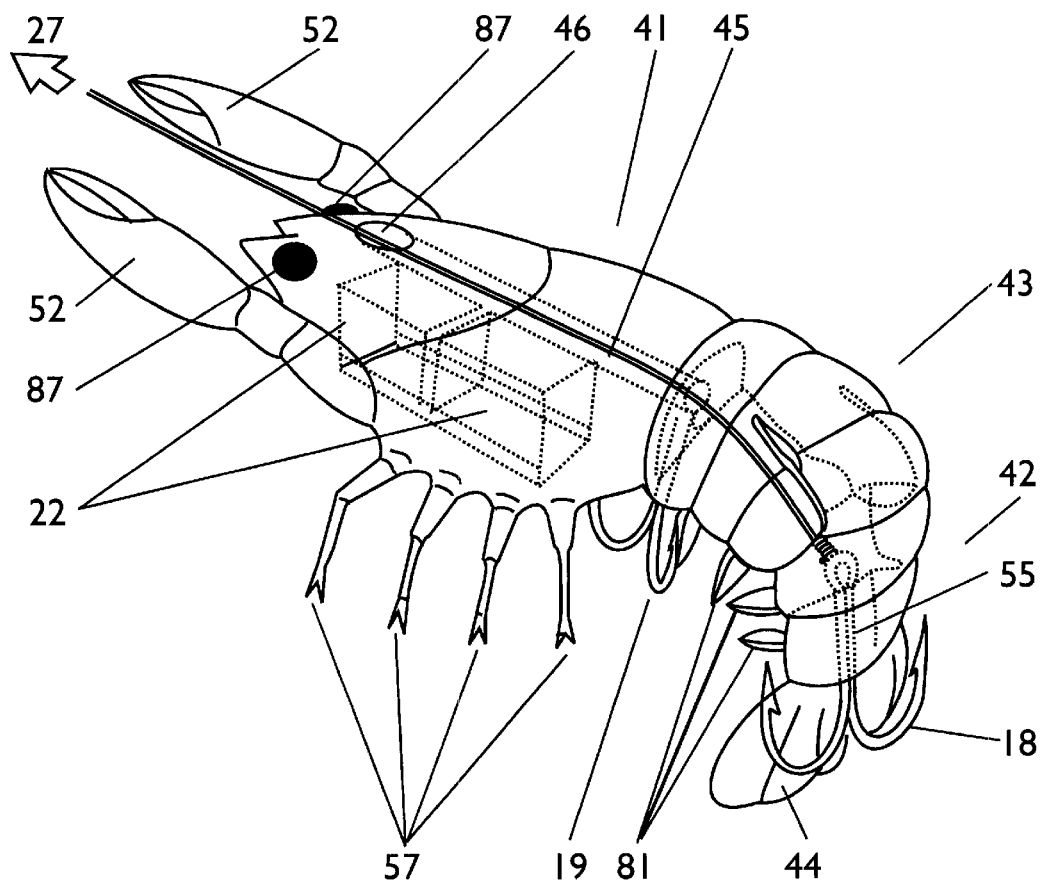
FIG. 17 is a perspective view of the fishing lure of FIG. 15 in a flexed position.

As illustrated in FIGS. 15 and 16, the lure 40 is proportioned so that the dimensions of the length of the forward portion 41, flexion region 43, rearward portion 42, the depth of the forward portion 41 and the width of the forward portion 41 are approximately of the ratio of 8:7:3:4:4.

In each of the lures depicted in the drawings, the lure may be provided with only one of the upper and lower passages. It is generally preferred to provide only the upper passage 16, 46 but, depending on the specific fishing application and environment, it may be desirable to additionally provide the lower passage 17, 47.

In preferred embodiments of the invention, the optional hook 19 is threaded on the line 15, 45 but is slotted into place adjacent the flexure region 13, 43 in a slot defined between the forward portion 11, 41 and a hook locator 24. The hook locator 24 is connected to the forward portion 11, 41 on the under side thereof in the region of the outlet of the upper and lower passages and has a slot or gap therein for allowing the line 15, 45 to pass or be threaded therethrough. The slot defined between the forward portion 11, 41 and the hook locator 24 serves to retain the optional hook 19 in place while the line 15,45 maybe threaded through an eye of the hook 19 for retention of the hook 19. This arrangement for securing the optional hook 19 advantageously serves to keep the hook 19 from sliding down the line 15, 45 toward the main hook 18 and interfering with the tail flicking action when the rearward portion 12, 42 is brought forward towards the forward portion 11, 41. Only the tautness of the line 15 in use keeps the hook 19 from falling from the hook locator 24. Advantageously, the hook 19 may be unslotted from the hook locator 24 if a fish becomes hooked on the hook 19. This allows for easier removal of the hook 19 from the fish once the fish is landed.

The illustrated embodiments of the lure relate to simulated crustaceans generally of a prawn shape and of a crayfish shape. The form and configuration of each lure is at least somewhat tailored to optimize the simulation of the particular crustacean. For example, the simulated crayfish lure 40 has a larger simulated cephalothorax than that of the simulated prawn, while the prawn has a longer, narrower abdomen and does not include simulated claws. These and other features of a lure will depend on the particular characteristics of the crustacean which is simulated by the lure. Advantageously, the injection molding process by which the lures are formed allows for these features to be easily tailored as desired during the manufacturing process.

Figure 18:
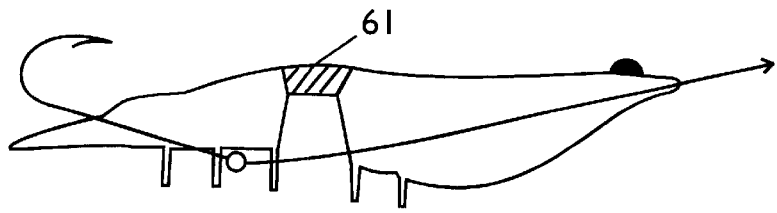
FIGS. 18 to 23 show side views of six further fishing lures according to alternative embodiments of the invention, each showing an alternative connection arrangement of the forward and rearward portions.
Figure 19:
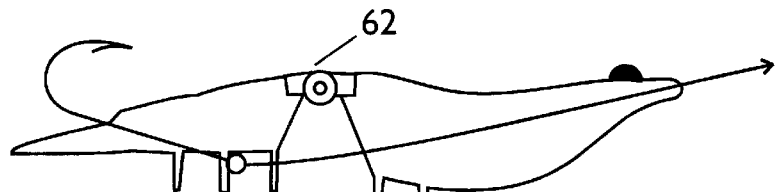
Figure 20:
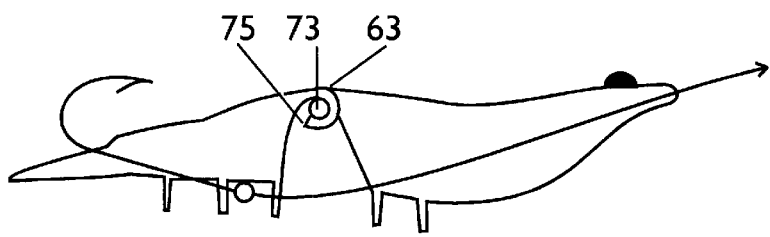
Figure 21:
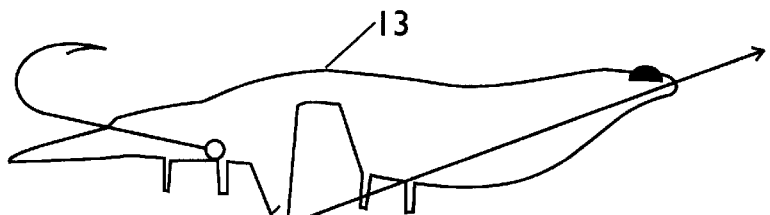
Figure 22:
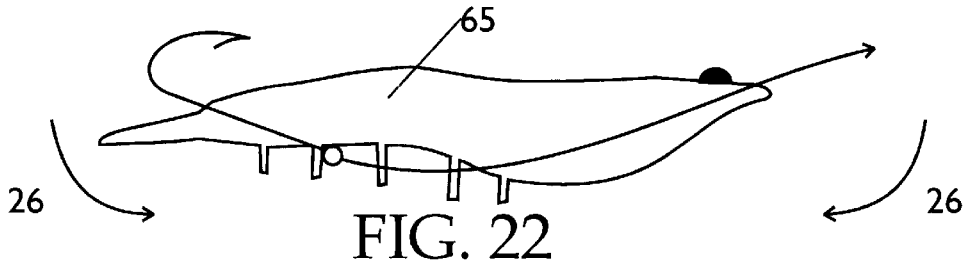
Figure 23:
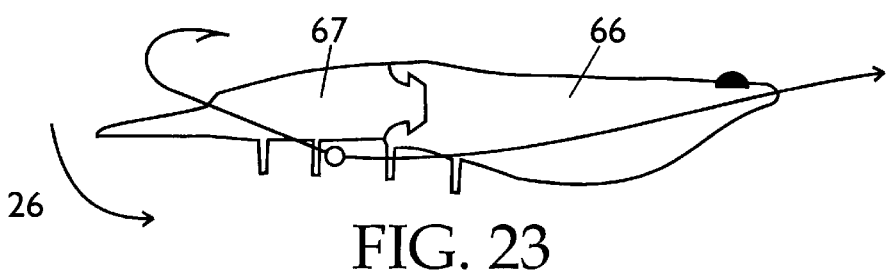

Referring to FIGS. 18 to 23, six alternative forms of fishing lure are shown each having a forward portion 11 and a rearward portion 12 as described in relation to FIGS. 1 to 11. In FIG. 18, a flexible bridging portion 61 is provided between the forward portion 11 and the rearward portion 12. In FIG. 19, a hinge 62 connects the forward portion 11 to the rearward portion 12. In FIG. 20, the connection between the forward portion 11 and the rearward portion 12 is arranged as a hinged joint 63 by having a loop portion 75 on the rearward portion and a pin portion 73 on the forward portion. In FIG. 21, the lever action is enhanced by providing a downward directed protrusion 64 on the rearward portion 12 so that the connection between the fishing line and the rearward portion 12 is further away from the flexure region 13. In FIG. 22, the entire fishing lure is formed from an inherently flexible material 65 so that tugging on the fishing line will cause flexure of the entire fishing lure in the direction of the arrows 26. In FIG. 23, a rigid forward portion 66 is connected to a flexible rearward portion 67 formed from an inherently flexible material in the same manner as the inherently flexible fishing lure of FIG. 22. Tugging on the fishing line will cause the flexible rearward portion to flex downwards in the direction of the arrow 26. While these alternative embodiments are shown in relation to a simulated prawn lure, the described alternative features may also be applicable to other simulated crustacean lures, such as the simulated crayfish lure.

Figure 24:
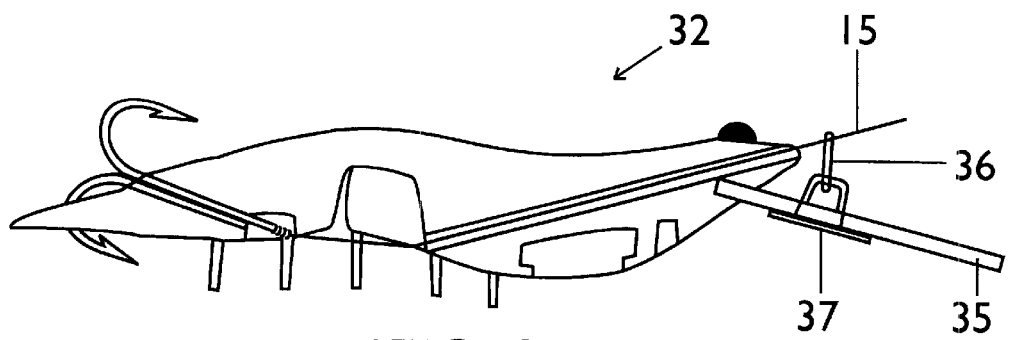
FIGS. 24 and 25 show a side cross-section and a top view respectively of another lure according to an embodiment of the invention having a bib.
Figure 25:
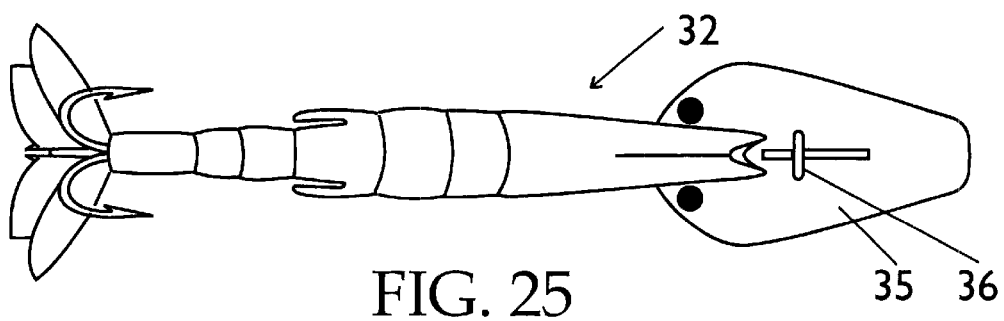

Referring to FIGS. 24 and 25, another lure 32 in the form of a shrimp or prawns similar to that of FIGS. 1, 2 and 5 to 8, includes a plate-like bib 35. A fishing line 15 is threaded through a loop 36 connected to a bib anchor 37 fixed to the bib 35.

Figure 26:
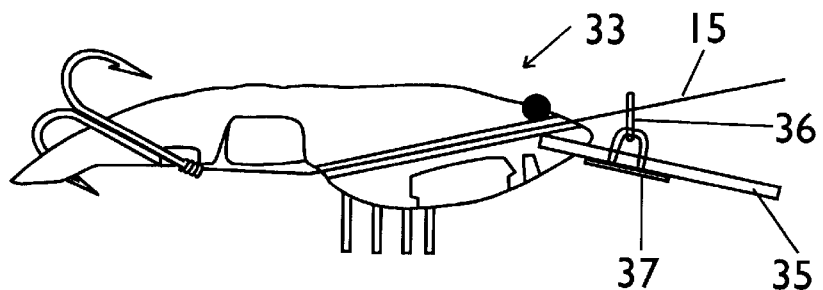
FIGS. 26 and 27 show a side cross-section and a top view respectively of yet another lure according to an embodiment of the invention having a bib.
Figure 27:
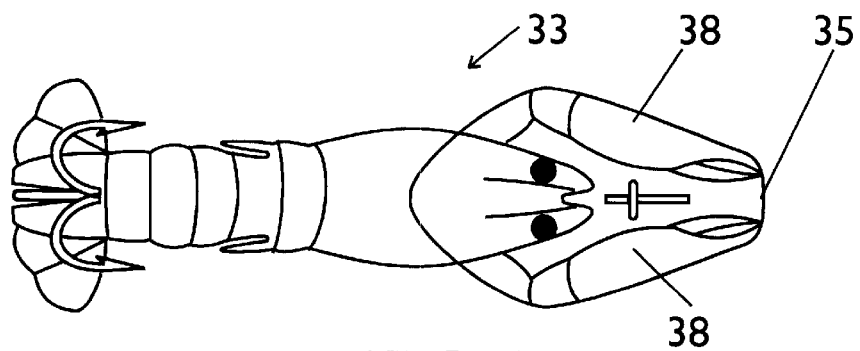
Figure 28:
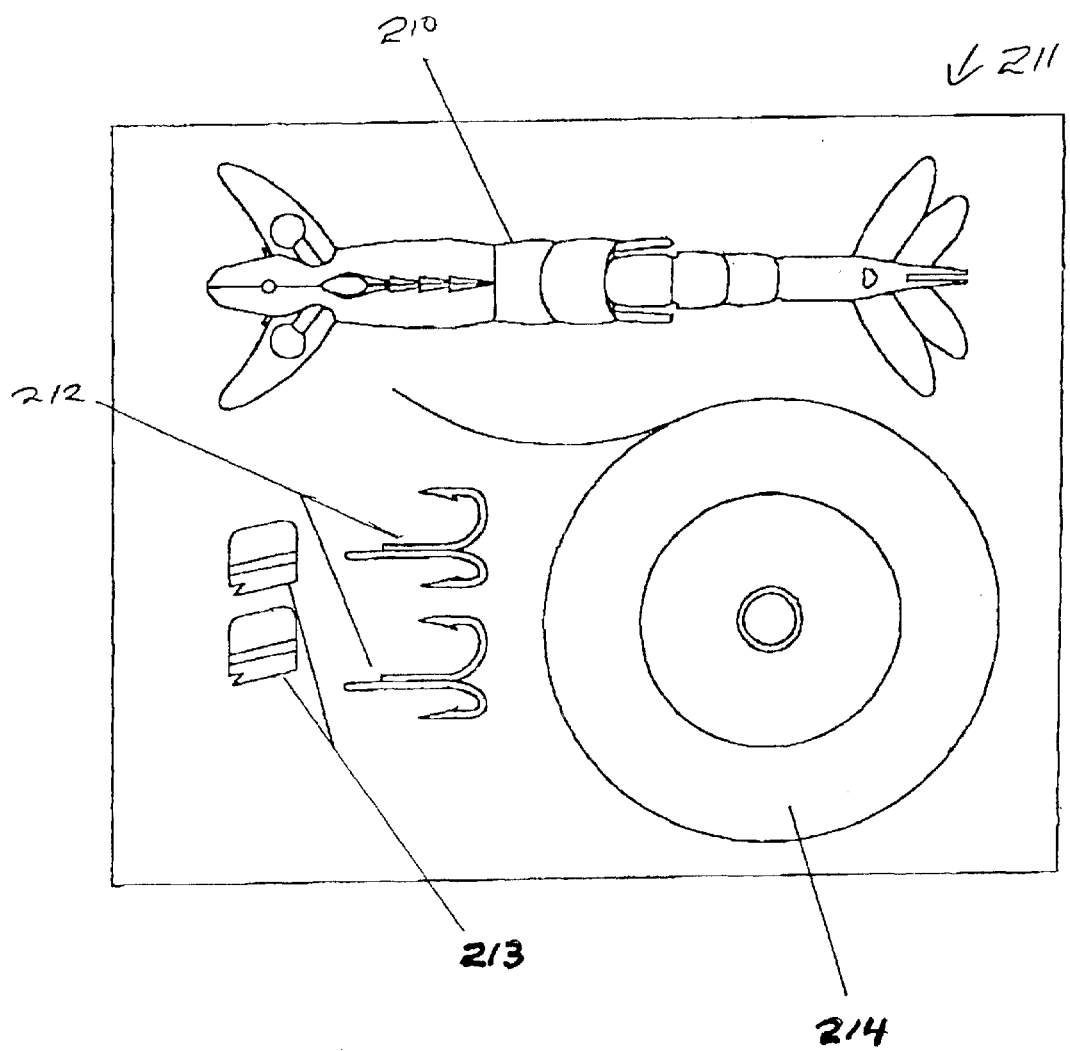
FIG. 28 is a top view of a kit including a lure of the preferred embodiment.

Referring to FIGS. 26 and 27, yet another lure 33 in the form of a lobster or crayfish similar to that of FIGS. 12 to 17, includes a plate-like bib 35 installed thereon by threading a fishing line 15 through a loop 36 connected to a bib anchor 37 fixed to the bib 35 (similarly to the lure 32 as described in relation to FIGS. 24 and 25). The bib 35 of the lure 33 includes (or at least appears to include) a pair of claws 38 simulating the claws of a lobster or crayfish.

The arrangement of the bib 35, loop 36 and bib anchor 37 is such that the bib is angled downwards in the front of the lure and, in use, stabilizes the lure when being towed through the water.

"FIG. 29 shows a package 211 comprising a fishing lure 210 according to the embodiment of FIG. 2, with separate hooks 212, a weight means in the form of a sinker 213 and a roll of fishing line 214."

The stabilizing projections 82 shown in FIGS. 1 to 11 are equivalent to the simulated claws 52 shown in FIGS. 12 to 17. The stabilizing projections 82 project forward an angularly outward and are angled slightly downwardly so as to maintain the lure in the normal upright position in which a shrimp would normally travel through the water. The stabilizing projections 82 also serve to provide some resistance to forward movement of the hire, this resistance being accentuated when the lure is sharply pulled forward. The shape of the stabilizing projection 82 is such as to induce an inertial resistance from the water against the stabilizing projections to thereby facilitate the relative movement of the rearward portion 12 with respect to the forward portion 11. In the absence of an induced inertial resistance of the water to the movement of the lure 10, the tail flicking action may be harder to generate as the entire lure 10 may have the tendency to move forward through the water more easily in response to a sharp pull on the line 15. Advantageously, the stabilizing projection 82 may be enlarged or reduced when manufactured so as to generate greater or lesser resistance from the water to forward movement of the lure 10.

A preferred form of the lure 10 is such that it is molded to have multiple simulated thoracic appendages, multiple simulated pleopods and a realistically simulated uropod. Further, the abdominal segments and carapace are preferably moulded so as to be discemably distinct and realistically shaped. Similarly with the form of the lure 40, it is desirable that the uropod (or uropods), pleopods, thoracic appendages, carapace and abdominal segments all be moulded so as to be discemably distinct and to realistically simulate the actual shape of a crayfish.

The fishing lure of the present invention may be moulded, for example, from a plastics material, to a shape simulating a number of different species within the subphylum crustacea.

In use, the fishing lure is attached to a fishing line by placing the hooks in position, threading the line through the hook or hooks and tying off the line.

The tail flicking action of the lure may be generated as the lure is retrieved back to the angler through the water after it is cast. The angler may let the lure descend below the water surface and either move the lure through the water or permit it to decelerate or stop in the water depth. Using an accelerated twitching, flicking, pulling or tugging of the lure in a forward-moving direction can be intermittently used with the application of a slow retrieve action. This process of retrieving and inducing the flick can be repeated in a series of actions until the lure is returned to the angler. Trolling (an angling method in which the lure is towed through the water behind a marine vessel) may maintain the lure at a depth range depending on the speed of the vessel. The flicking action may be induced by tugging the fishing line as the lure is towed through the water. The shape of the forward portion of the crustacean, including, in the case of crayfish-type crustaceans, the front claws, assists in stabilizing the lure in an upright orientation during trolling, and the weight assists in maintaining an upright orientation when the lure is stationary or close to stationary. The lure may be fitted with a bib in the form of a rigid disc which forces the lure downward under normal forward motion through the water to assist in ensuring the lure dives to a desired water depth.

Preferred embodiments of the invention advantageously simulate the physical characteristics of a range of species in the crustacean subphylum and are adapted to simulate a forward slow swimming action as well as a distress response tail articulation or flick action. Embodiments of the invention may include one or more of the following advantageous features:

The flexible connection permits the movement of the rearward portion 12 of the device in a downward flexing motion and in the direction of the forward portion 11 and includes the biasing means which returns the rearward portion 12 to the rest position. The lure 10, 40 can rapidly adopt the flexed position to simulate the rapid tail movement upon rapid tugging of the fishing line. The degree of pivoting of the rearward portion 12 will depend upon the degree of force applied to the fishing line in the tugging action. The lure 10, 40 may be relatively static in the water in a "neutral" swimming position, and the tail flicking motion induced by a tugging or flicking of the fishing line. Alternatively, or in combination, a steady tension maybe applied to the fishing line to induce a swimming or crawling action. Scented or flavoured pellets, lotions, powders, oils or such like can be applied to the capsule to assist in attracting fish to the lure.

Many features described in relation to the simulated prawn lures will also be applicable to the simulated crayfish lures described herein and vice-versa. Such features may also be applicable to other simulated crustaceans not explicitly adverted to herein but encompassed by the spirit and scope of the invention.

While the above description is made by way of illustrative examples of the present invention, various modifications or variations will be apparent to persons skilled in the art without departing from the spirit and scope of the invention.

What is claimed is:

1. A fishing lure of the type that simulates a crustacean including:
    a forward portion adapted to simulate a forward portion of the crustacean;
    a rearward portion adapted to simulate a rearward portion of the crustacean, the rearward portion being flexibly connected to the forward portion such that the forward portion and rearward portion may be moved with respect to each other between a flexed position and a rest position;
    connection means on the rearward portion for connection of a fishing line to the rearward portion; and
    guide means through which the fishing line may slidably pass, the guide means being associated with the forward portion whereby, in use, a tugging action on the fishing line causes the rearward portion to move with respect to the forward portion from the rest position towards the flexed position such that a portion of the rearward portion is positioned within the forward portion with an associated shortening of a ventral body line of the lure to simulate a tail flicking motion of the crustacean.

2. A fishing lure according to claim 1 wherein the forward portion corresponds to the head of the crustacean and the rearward portion corresponds to a tail of the crustacean.

3. A fishing lure according to claim 1 further comprising biasing means for biasing the forward and rearward portions to the resting position.

4. A fishing lure according to claim 3 wherein a hinge connection serves as the biasing means acting between the forward portion and the rearward portion.

5. A fishing lure according to claim 4 wherein the hinge connection comprises an elastomeric bridging portion between the forward portion and the rearward portion.

6. A fishing lure according to claim 5 wherein the elastomeric bridging portion comprises inherently resilient material constituted by elastic memory inherent in the elastomeric material forming the bridging portion.

7. A fishing lure according to claim 1 wherein the forward portion and rearward portion are formed integrally from an inherently resilient material and one or more sections of a smaller cross section provided to constitute flexible connection.

8. A fishing lure according to claim 1 wherein relative movement between the forward and rearward portions is about a non-fixed axis.

9. A fishing lure according to claim 1 wherein an arrangement of guide means and connection means results in a hinged pivoting movement between forward and rearward portions upon tugging of the fishing line.

10. A fishing lure according to claim 1 wherein the rearward portion comprises a plurality of interconnected segments each of which is flexibly connected to another in the same manner to a flexible connection between the forward portion and the rearward portion and at least one of the segments is operably associated with the guide means and connection means.

11. A fishing lure according to claim 1 wherein the guide means is in the form of a channel or passage in the forward portion.

12. A fishing lure according to claim 1 wherein a flexible connection connecting the rearward portion and the forward portion is positioned remote from the path that the fishing line takes through the guide means.

13. A fishing lure according to claim 1 wherein the connection means is arranged so that the fishing line follows a non-linear path through the guide means in such manner that the application of a tugging force to the fishing line transmits a tugging force to the rearward portion causing a flexing of a flexible connection connecting the forward portion to the rearward portion.

14. A fishing lure according to claim 3 wherein the biasing means is inherent in a flexible connection connecting the forward portion and the rearward portion.

15. A fishing lure according to claim 1 wherein the connection means is constituted by the eye of a fishing hook fixedly or removably mounted relative to the rearward portion.

16. A fishing lure for mimicking characteristics of a crustacean in water, including:
    a head portion wherein the head portion has at least one projection associated therewith and a tail portion has at least one second projection associated therewith;
    a tail portion having at least one fan portion at an end thereof; and
    a flexible bridge portion connecting the head and tail portions whereby the head portion and tail portion are resiliently and rotationally movable relative to each other through flexion of the bridge portion with an associated shortening of a ventral body line of the lure whereby, in use in water, when the tail portion is caused to move rotationally toward the head portion, the at least one fan portion creates a pressure wave in the water, detectable by a fish and simulative of the pressure wave created by a tail flicking action of an actual crustacean and wherein when the tail is caused to move rotationally toward the head portion to at least a predetermined degree, respective ones of the at least one first projection and the at least one second projection are caused to frictionally engage each other to create a sound detectable by a fish and simulative of the sound created by a tail flicking action of an actual crustacean.

17. A fishing lure according to claim 16 wherein the head portion, tail portion and bridge portion are formed integrally as parts of the fishing lure.

18. A fishing lure according to claim 17 wherein the body portion is injection moulded from a plastics material having an elastic memory.

19. A fishing lure according to claim 18 wherein the plastics material is polyurethane of from about 30 to about 140 duro hardness.

20. A fishing lure according to claim 19 wherein the plastics material is polyurethane of from about 60 to about 100 duro hardness.

21. A fishing lure according to claim 20 wherein the plastics material is polyurethane of about 80 duro hardness.

22. A fishing lure according to claim 16 wherein the lure simulates a member of the family penaeidae, aristeidae, solenoceridae, astacidae, austroastacidae or parastacidae.

23. A fishing lure according to claim 20 wherein the lure simulates a prawn.

24. A method for catching an aquatic animal, said method comprising attracting said aquatic animal to a fishing lure of the type that simulates a crustacean including:
  a forward portion adapted to simulate a forward portion of the crustacean;
  a rearward portion adapted to simulate a rearward portion of the crustacean, the rearward portion being flexibly connected to the forward portion such that the forward portion and rearward portion may be moved with respect to each other between a flexed position and a rest position;
  connection means on the rearward portion for connection of a fishing line to the rearward portion; and
  guide means through which a fishing line may slidably pass, the guide means being associated with the forward portion whereby, in use, a tugging action on the fishing line causes the rearward portion to move with respect to the forward portion from the rest position towards the flexed position wherein the rearward portion and forward portion move towards each other in a manner that creates an associated shortening of a ventral body line of the lure to simulate a tail flicking motion of the crustacean and wherein hook means on the lure is capable of hooking the aquatic animal.

25. A method according to claim 24 wherein the forward portion corresponds to a head of the crustacean and the rearward portion corresponds to a tail of the crustacean.

26. A method according to claim 24 further comprising biasing means for biasing the forward and rearward portions to the resting position.

27. A method according to claim 26 wherein a hinge connection serves as the biasing means acting between the forward portion and the rearward portion.

28. A method according to claim 27 wherein the connection comprises an elastomeric bridging portion between the forward portion and the rearward portion.

29. A method according to claim 28 wherein the elastomeric bridging portion comprises inherently resilient material constituted by elastic memory inherent in elastomeric material forming the bridging portion.

30. A method according to claim 24 wherein the forward portion and rearward portion are formed integrally from an inherently resilient material and one or more sections of a smaller cross section provided to constitute flexible connection.

31. A method according to claim 24 wherein relative movement between the forward and rearward portions is about a non-fixed axis.

32. A method according to claim 24 wherein an arrangement of guide means and connection means results in a hinged pivoting movement between the forward and rearward portions upon tugging of the fishing line.

33. A method according to claim 24 wherein the rearward portion comprises a plurality of interconnected segments each of which is flexibly connected to another in the same manner to a flexible connection between the forward portion and the rearward portion and at least one of the segments is operably associated with the guide means and connection means.

34. A method according to claim 24 wherein the guide means is in the form of a channel or passage in the forward portion.

35. A method according to claim 24 wherein a flexible connection connecting the forward and rearward portions is positioned remote from the path that the fishing line takes through the guide means.

36. A method according to claim 24 wherein the connection means is arranged so that the fishing line follows a non-linear path through the guide means in such manner that the application of a tugging force to the fishing line transmits a tugging force to the rearward portion causing a flexing of a flexible connection connecting the forward and rearward portions.

37. A method according to claim 24 wherein the aquatic animal is a fish.

38. A method according to claim 24 wherein a head portion of the lure includes one forward projection extending therefrom and having sufficient surface area so as to meet with the inertial resistance of the water against forward movement of the lure when the lure is pulled forward.

39. A method according to claim 24 wherein the biasing means is inherent in a flexible connection flexibly connecting the forward portion and the rearward portion.

40. A package comprising multiple components wherein a first component comprises a fishing lure of the type that simulates a crustacean including:
  a forward portion adapted to simulate a forward portion of the crustacean;
  a rearward portion adapted to simulate a rearward portion of the crustacean, the rearward portion being flexibly connected to the forward portion such that the forward portion and rearward portion may be moved with respect to each other between a flexed position and a rest position in response to a tugging action on the fishing line such that a section of one of the rearward portions and forward portions are positioned within the other to create an associated shortening of a ventral body line of the lure in response to tugging on the fishing line;
  guide means through which a fishing line may slidably pass, the guide means being associated with the forward portion whereby, in use, a tugging action on a fishing line causes the rearward portion to move with respect to the forward portion from the rest position towards the flexed position to simulate a tail flicking motion of the crustacean; and a second component comprising one or more hooks.

41. The package according to claim 40 further including a third component comprising weight means.

42. The package according to claim 41 further including a fourth component comprising fishing line.

43. A fishing lure for use of the type that simulates a crustacean comprising:

a forward portion having a dorsal and a ventral side and having a front end, wherein the forward portion is adapted to simulate a forward portion of the crustacean;

a rearward portion having a dorsal and a ventral side wherein the rearward portion is pivotally attached to the forward portion and is adapted to simulate the rearward portion of the crustacean;

a fishing leader attached to the lure wherein the forward portion includes a channel that extends through the forward portion having a dorsal opening through which the fishing leader is positioned wherein the fishing leader extends through the channel to the ventral side of the rearward portion and is attached thereto such that a tug on the fishing leader results in the rearward portion pivoting with respect to the forward portion thereby increasing the inertial resistance of the water to the fishing lure causing the front end of the forward portion of the fishing lure to rotate downward and wherein the dorsal opening is spaced away from the front end of the forward portion to facilitate downward rotation of the front end of the forward portion of the fishing lure.

* * * * *